US012687017B2

(12) United States Patent
Babinsky

(10) Patent No.: US 12,687,017 B2
(45) Date of Patent: Jul. 21, 2026

(54) FLOOR ASSEMBLY

(71) Applicant: ASB Systembau Horst Babinsky GmbH, Stein (DE)

(72) Inventor: Christof Babinsky, Rosenheim (DE)

(73) Assignee: ASB Systembau Horst Babinsky GmbH, Stein (DE)

( * ) Notice: Subject to any disclaimer, the term of this patent is extended or adjusted under 35 U.S.C. 154(b) by 150 days.

(21) Appl. No.: 18/437,834

(22) Filed: Feb. 9, 2024

(65) Prior Publication Data

US 2025/0257567 A1 Aug. 14, 2025

(51) Int. Cl.
| | |
|---|---|
| *E04B 5/46* | (2006.01) |
| *A63C 19/00* | (2006.01) |
| *B32B 17/10* | (2006.01) |
| *E04F 15/024* | (2006.01) |

(52) U.S. Cl.
CPC .............. *E04B 5/46* (2013.01); *A63C 19/00* (2013.01); *B32B 17/10064* (2013.01); *B32B 17/10146* (2013.01); *E04F 15/02447* (2013.01); *A63C 2203/14* (2013.01); *B32B 2307/406* (2013.01); *B32B 2307/414* (2013.01); *B32B 2307/7376* (2023.05); *B32B 2307/744* (2013.01)

(58) Field of Classification Search
CPC .......... E04B 5/00–5/48; B32B 17/00–17/1099
See application file for complete search history.

(56) References Cited

U.S. PATENT DOCUMENTS

| | | | |
|---|---|---|---|
| 2004/0240230 A1 | 12/2004 | Kitajima et al. | |
| 2009/0103280 A1* | 4/2009 | Peard ........................ | E04B 5/46 |
| | | | 362/97.1 |
| 2012/0042586 A1 | 2/2012 | Shige et al. | |
| 2012/0297713 A1 | 11/2012 | Geith et al. | |
| 2024/0160057 A1* | 5/2024 | Zhao ................. | G02F 1/133524 |

FOREIGN PATENT DOCUMENTS

| | | | | |
|---|---|---|---|---|
| CN | 108682320 A | 10/2018 | | |
| CN | 110206267 A | * 9/2019 | ............. | G09F 19/22 |
| CN | 219536489 U | 8/2023 | | |
| GB | 304375 A | 1/1929 | | |
| WO | WO-2023173521 A1 * | 9/2023 | ......... | G02F 1/13336 |

OTHER PUBLICATIONS

Li et al. "Building Decorative Glass", Building Decorative Materials, Woodhead Publishing Series in Civil and Structural Engineering, (2011); pp. 139-168.*
Machine translation of CN 108682320. Retrieved Mar. 6, 2026.

* cited by examiner

*Primary Examiner* — Prashant J Khatri
(74) *Attorney, Agent, or Firm* — Banner & Witcoff, Ltd.

(57) ABSTRACT

A floor assembly may include an array of display devices facing in an upward direction, and a composite glass floor panel arranged above the array of display devices. The composite glass floor panel may be translucent and include a light diffusion layer.

21 Claims, 9 Drawing Sheets

Figure 1:
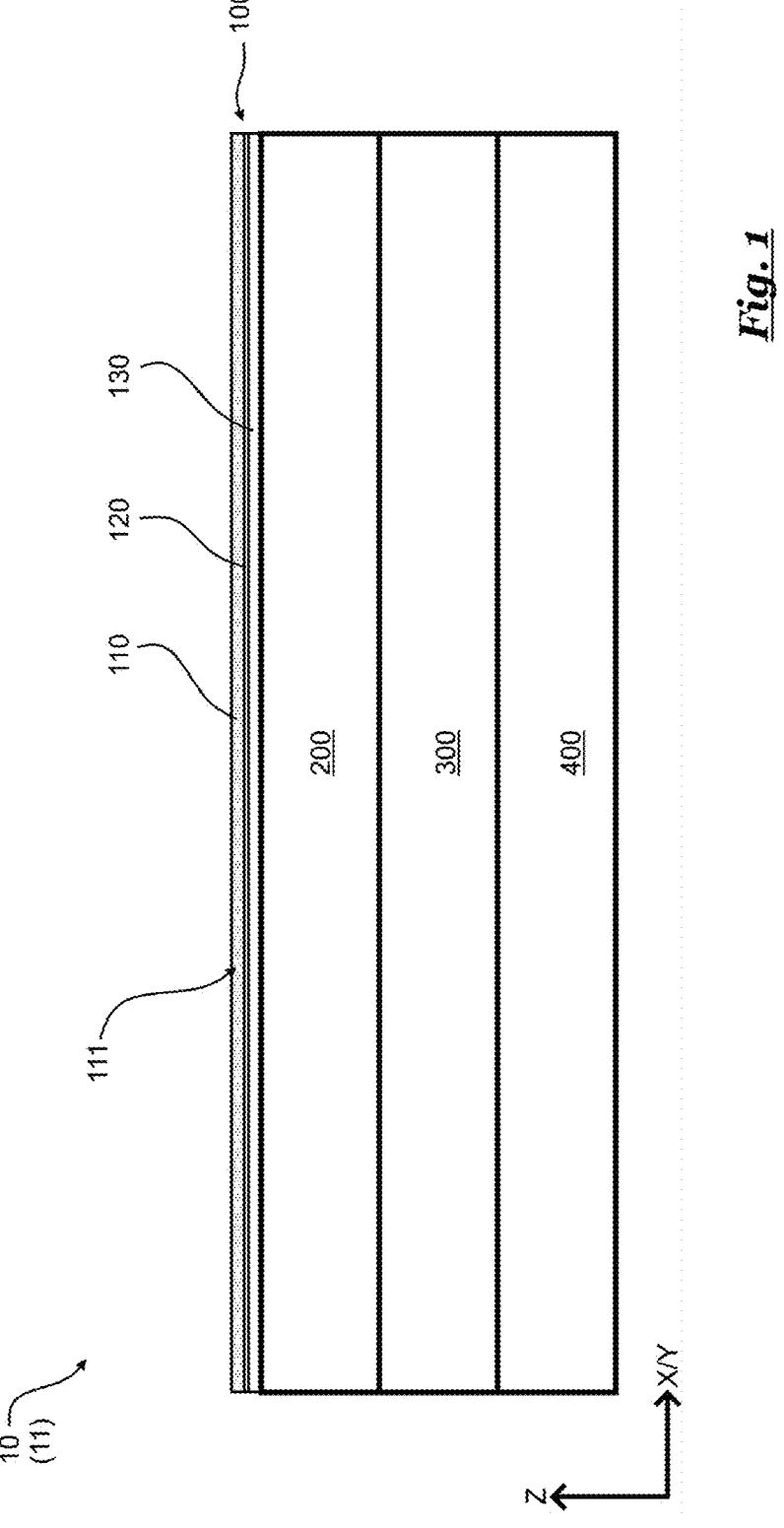

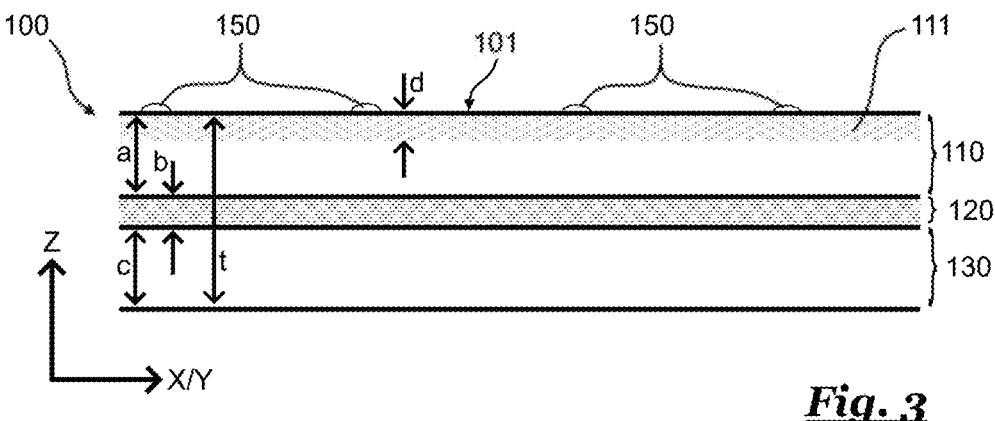
*Fig. 3*
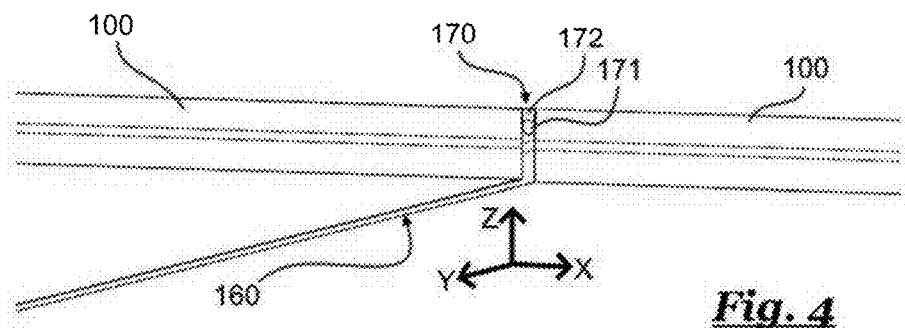
*Fig. 4*
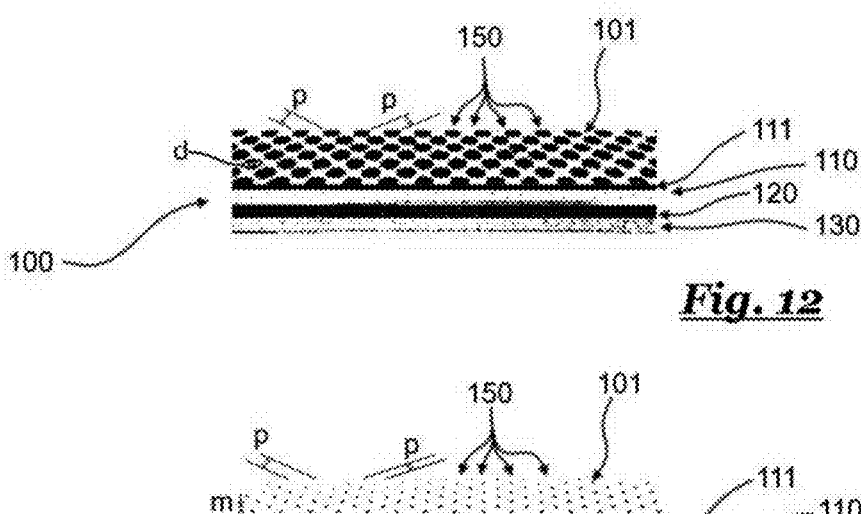
*Fig. 12*
*Fig. 13*

FLOOR ASSEMBLY

CROSS REFERENCE TO RELATED APPLICATIONS

This patent application is related to U.S. patent application Ser. No. 18/437,943, filed Feb. 9, 2024, titled "Floor Assembly," which is incorporated herein by reference in its entirety.

BACKGROUND

Technical Field

The present disclosure relates to a floor assembly, in particular a floor assembly incorporating display devices, such as light emitting diode (LED) display devices. Particularly, the disclosure relates to a sports floor assembly in which LED display devices may illuminate and thereby illustrate field markings and/or other images.

Technical Background

US 2004/0240230 A1 relates to a surface light-emitting device installed along a floor for lighting or decorative purposes. The device includes a light-emitting unit having a box-shaped casing with an open top, a plate-shaped reinforced plastic material installed in the top opening of the casing, a plate-shaped light-diffusing member below the reinforced plastic material, and a fluorescent tube or other light source for irradiating the light-diffusing member. The light source is arranged horizontally next to the light-diffusing member, in the outer circumferential box frame, facing inwards. Bolts for holding the devices are arranged at each corner thereof. Multiple devices can be arranged in vertical and horizontal rows. Each device is equipped with a power supply and dimming console arranged at the bottom. Each device can display an individual color so that a floor made from surface light-emitting devices forms a screen having a number of pixels corresponding to the number of devices, thereby limiting the image resolution of the screen substantially. The box-shaped casing surrounding each reinforced plastic plate causes interruptions in an image displayed by such a floor, which is detrimental to image quality and renders such a floor unable to display field markings. The box-shaped casing and bolt holes pose a risk for injuries and make the floor uneven so that the surface light-emitting devices may be used for decorative purposes but not as a playing field for sports.

US 2012/0042586 A1 describes a floor type multi-display apparatus comprising a plurality of displays, transparent panels and support members. The transparent panels are disposed in a coplanar manner to form a floor. They are spaced upwardly apart from the displays to define a gap therebetween. The plurality of transparent panels is supported by the support members. The support members include first support members disposed between adjacent displays in a scattered fashion, and second support members disposed around the multi-display. The support members are made of stainless steel and have respective plate portions positioned along and closely to edges of the displays. The support members carrying the transparent panels cause shadows and other interruptions affecting the image displayed by the display units. When the displays are used to show field markings, they will be visible in different places relative to the feet of the athletes and the balls they use depending on the individual viewing angle of the athlete, referee, spectator or camera, which renders the floor unsuitable for competitive or professional sports. Furthermore, heavy objects or athletes falling on critical spots of a transparent panel pose a risk of damage to the floor type-multi display apparatus and consequently a risk of injuries for the athletes. Athletes have also complained that the floor type multi-display apparatus occasionally causes a ball to behave in an irregular manner.

US 2012/0297713 A1 relates to an illuminated floor assembly. The floor assembly includes a composite glass floor panel suspended above an overlay and a substructure using polymer pads. The polymer pads are arranged along the edges of neighboring composite glass floor panels. Hook and loop fasteners attach the glass floor panels to the polymer pads below. An LED light channel is arranged between the composite glass floor panel and the overlay. Several LED light channels can be provided to illuminate field markings of a sports arena. The light channels can be designed to enable the representation of symbols or advertising. The illuminated floor assembly is known to provide excellent mechanical properties for athletes to compete thereon in different sports such as basketball, handball, squash and volleyball. However, only a small portion of the playing field can be used to display field markings or other symbols, and the markings or symbols which can be displayed are limited according to the structure of the light channels. If light channels are arranged in close proximity to one another, the image quality may be adversely affected by interruptions or shadows of the channel walls. Furthermore, the playing field to becomes stiff where channels are arranged close to each other.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a schematic illustration of a floor assembly according to the disclosure.

Figure 2:
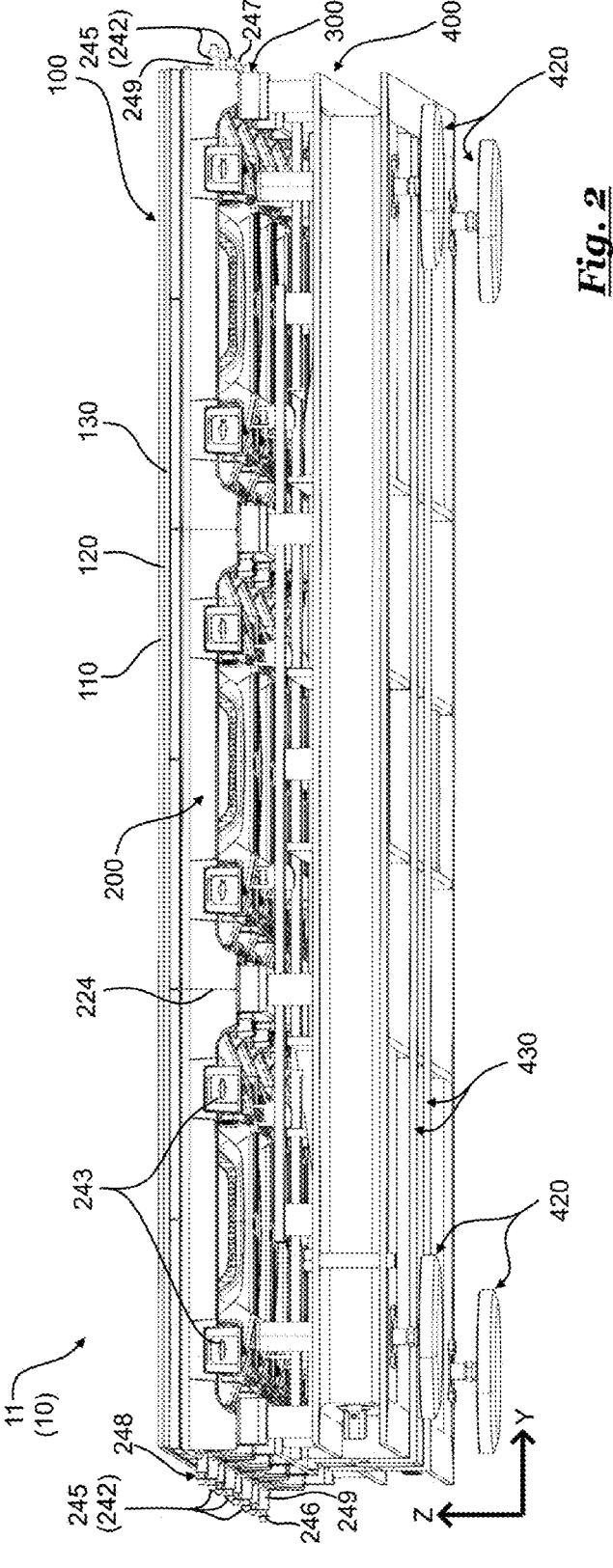

FIG. 2 an exemplary illustration of an assembly unit for a floor assembly according to the disclosure.

FIG. 3 a schematic illustration of a composite glass floor panel according to the disclosure.

FIG. 4 a schematic illustration of a pair of adjacent composite glass floor panels according to the disclosure.

Figure 5:
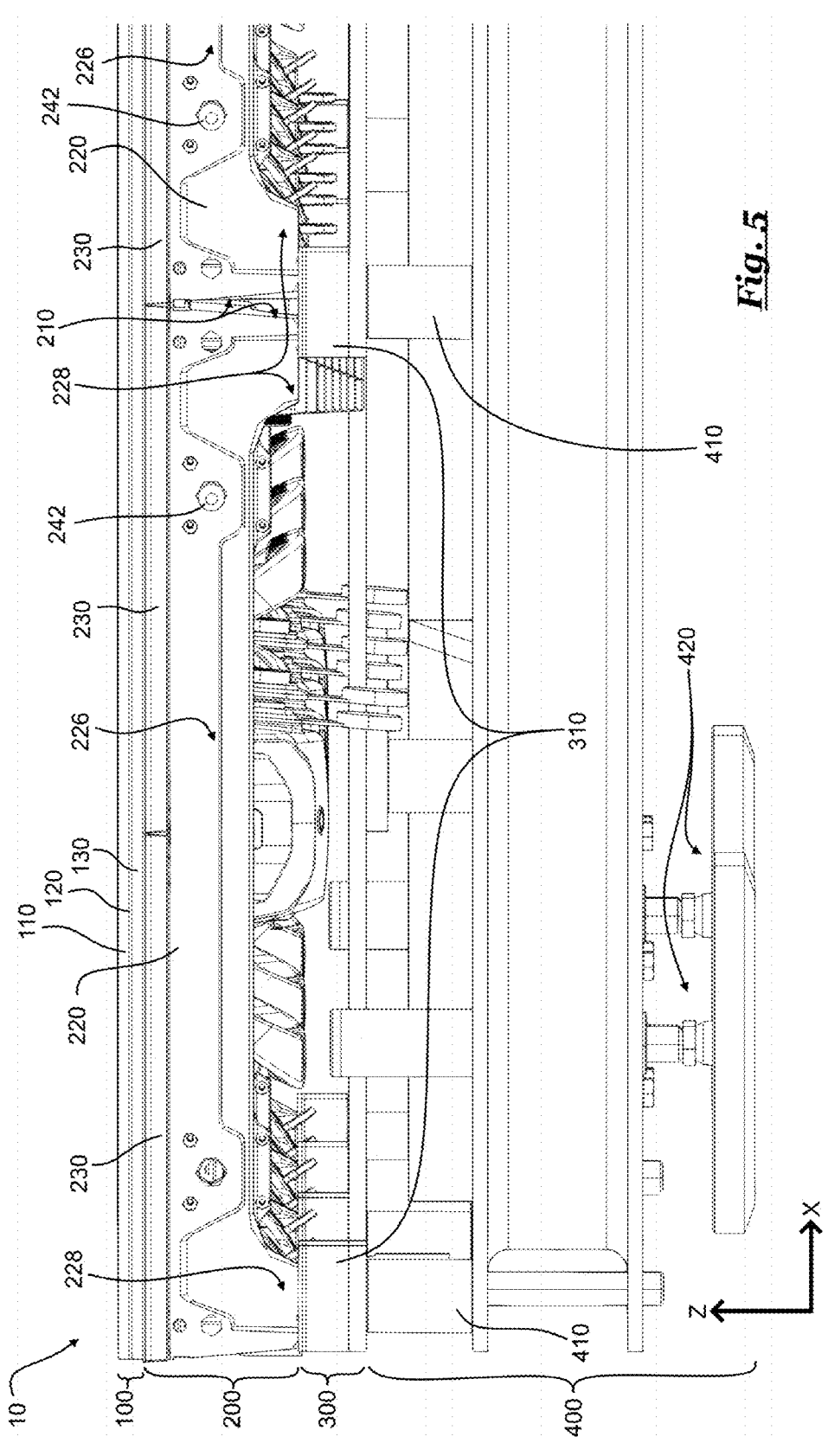

FIG. 5 a detailed side view of a floor assembly according to the disclosure.

Figure 6:
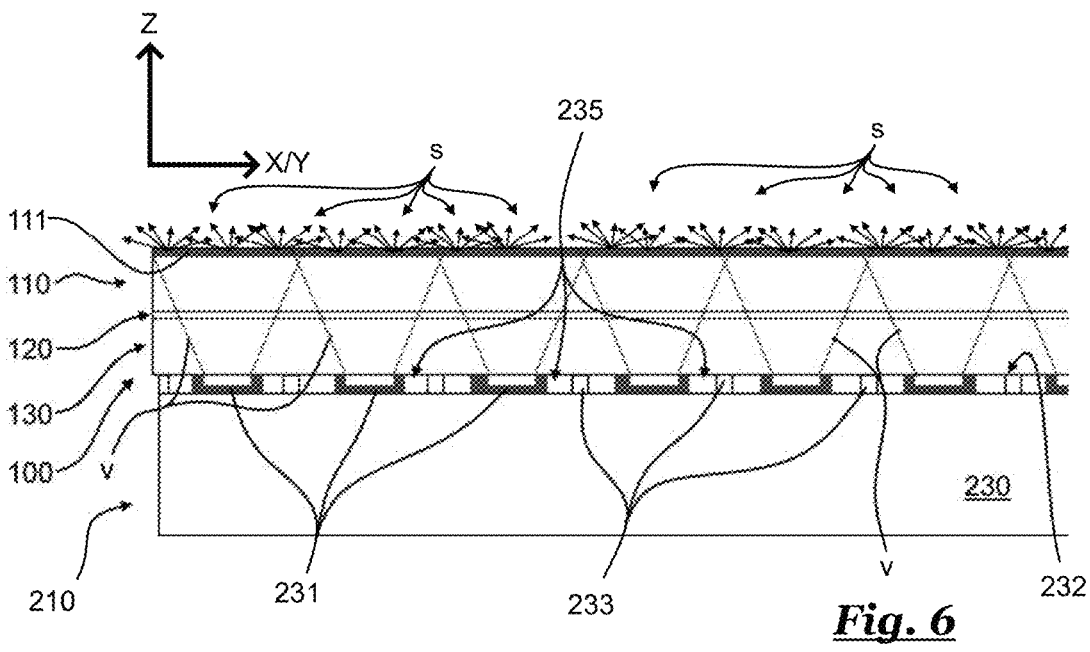

FIG. 6 a detailed view of a glass floor panel on a display unit according to the disclosure.

Figure 7:
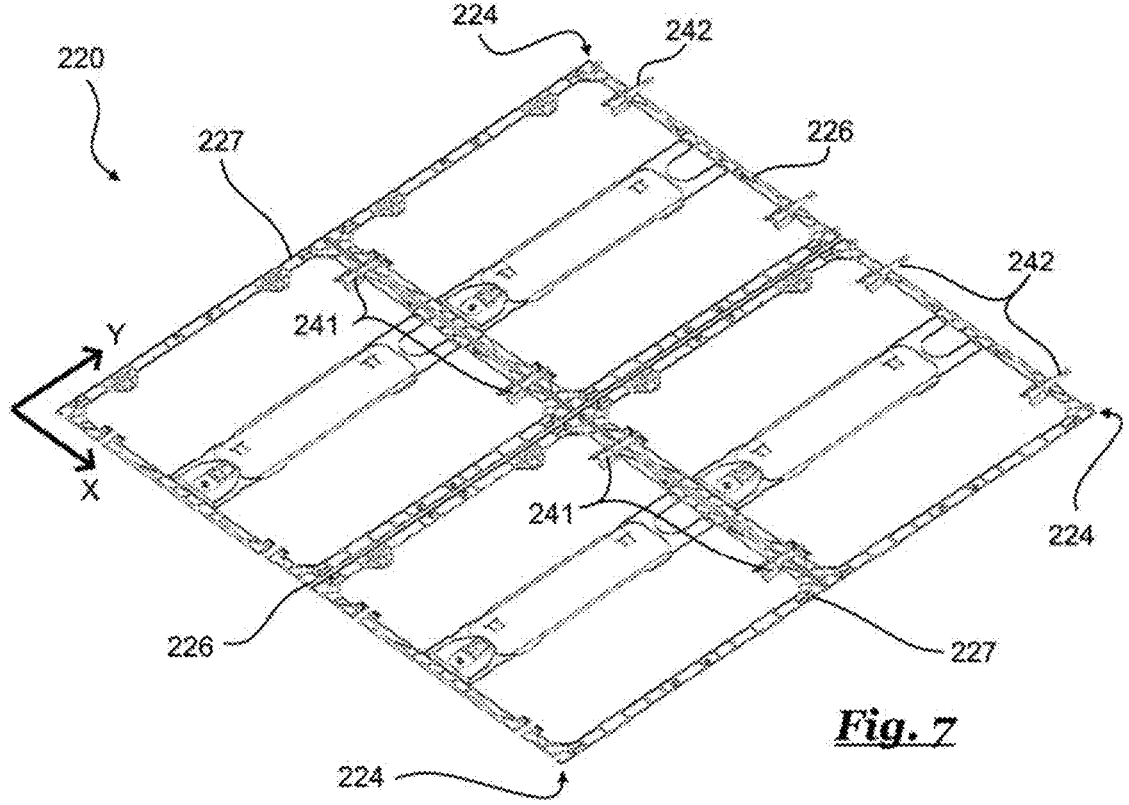

FIG. 7 a sectional view of a display device box structure according to the disclosure.

Figure 8:
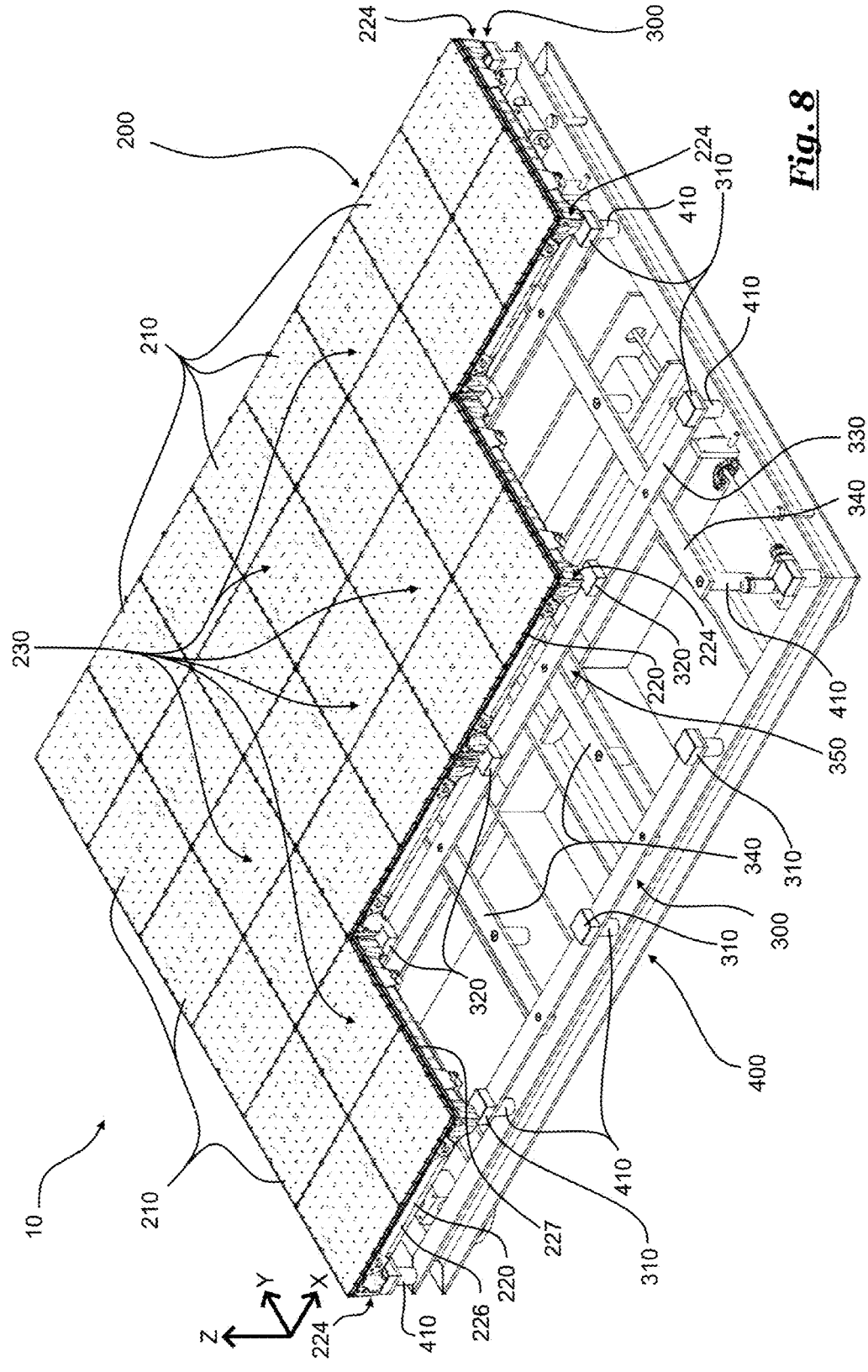

FIG. 8 a partial perspective illustration of a sports floor assembly according to the disclosure.

Figure 9:
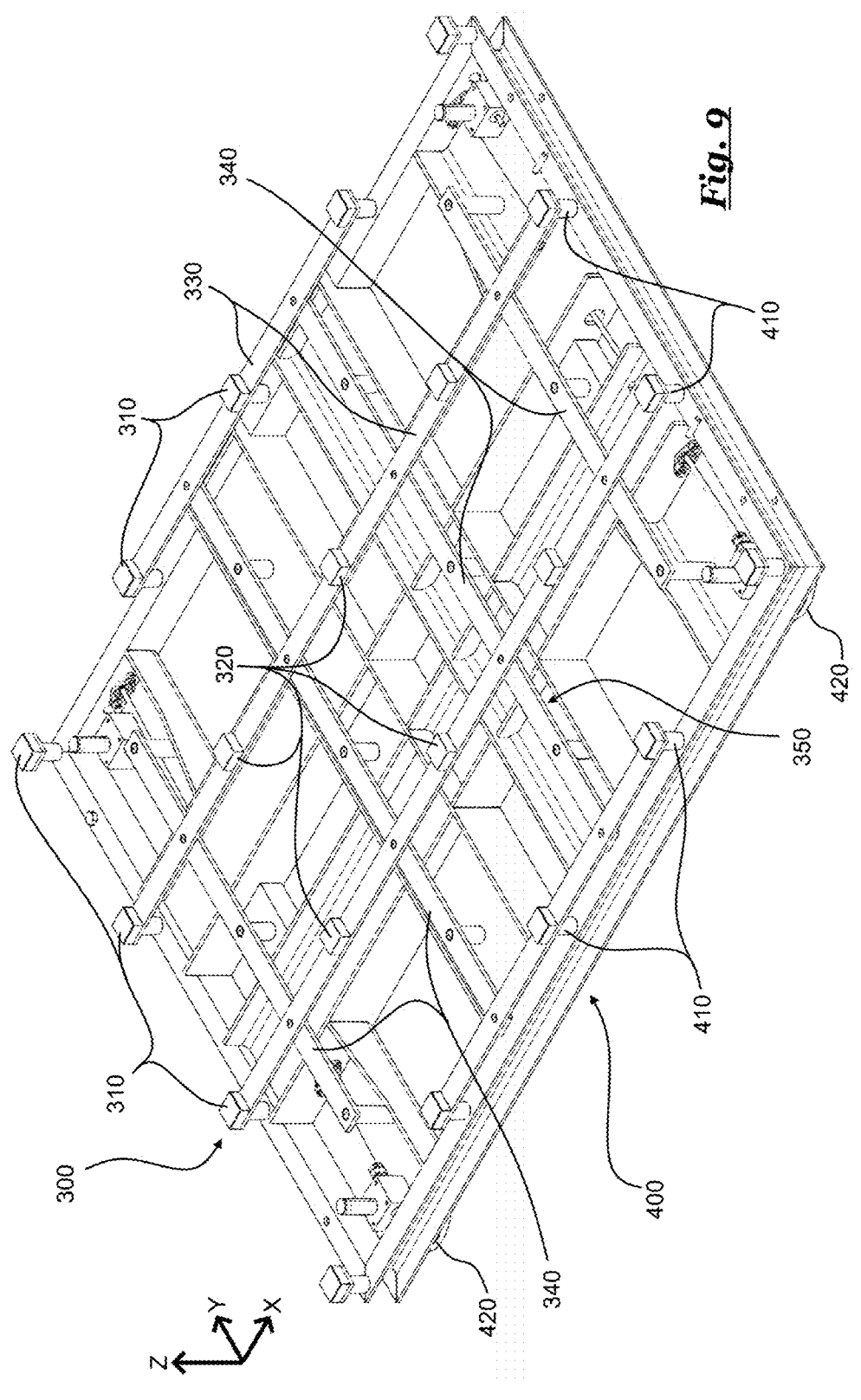

FIG. 9 a perspective view of a rigid substructure and an elastic support structure of a floor assembly according to the disclosure.

Figure 10:
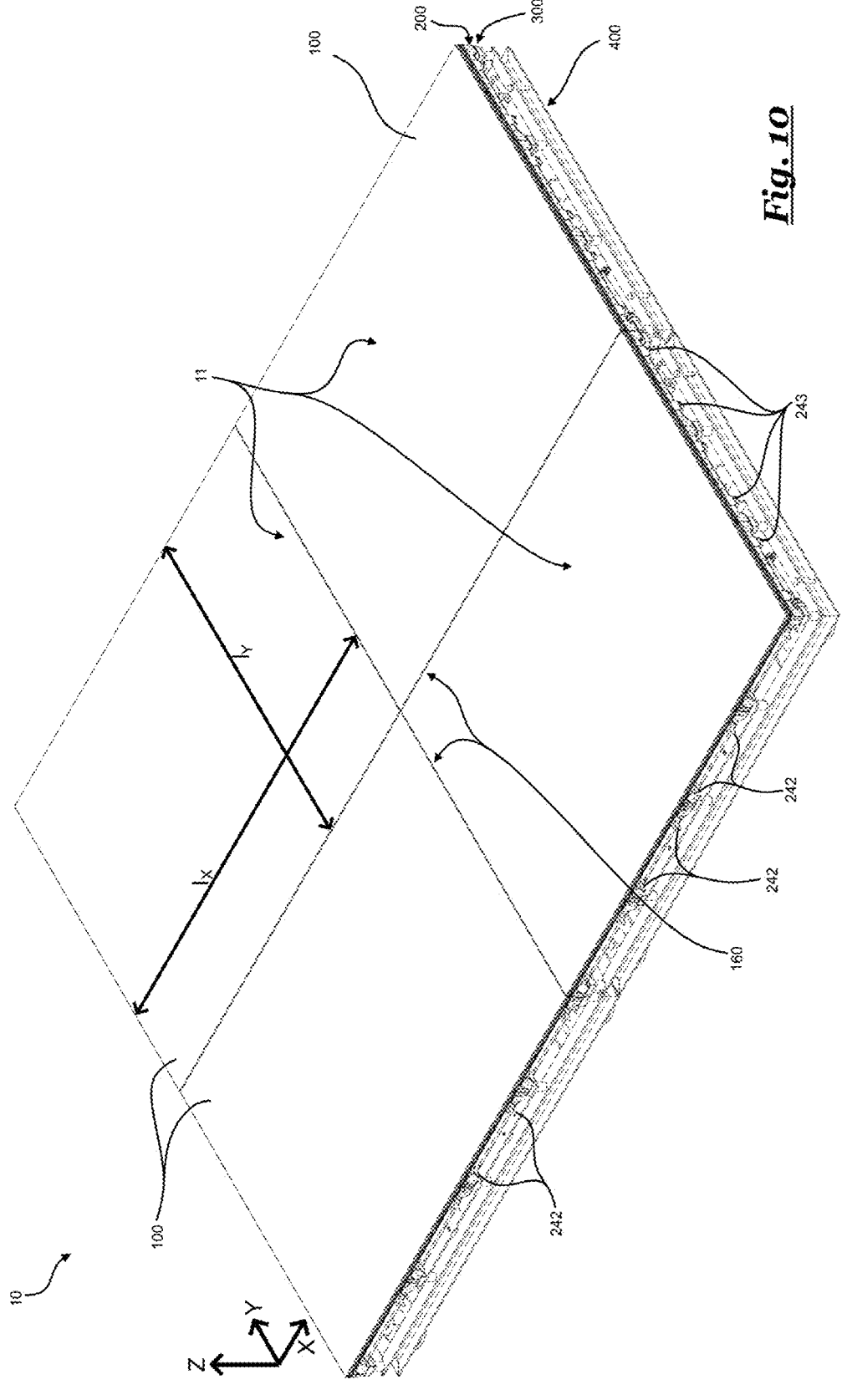

FIG. 10 a perspective view of floor assembly including multiple assembly units according to the disclosure.

Figure 11:
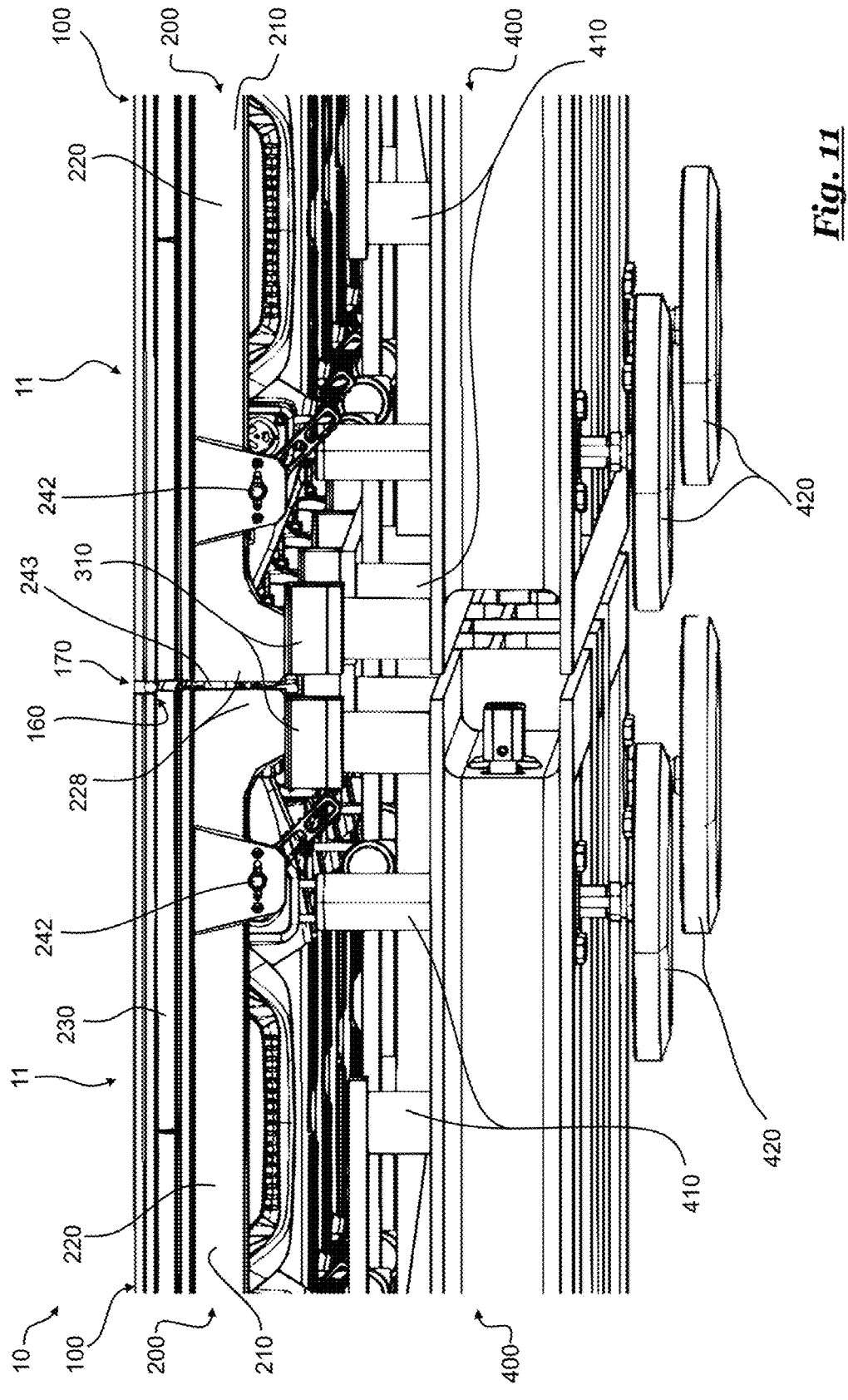

FIG. 11 a detailed side view of a pair of assembly units of a floor assembly according to the disclosure.

FIG. 12 a schematic perspective view of a composite glass floor panel according to the disclosure.

FIG. 13 a schematic perspective view of another composite glass floor panel according to the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

Hereinafter, various embodiments of the present disclosure will be described in detail with reference to the accompanying drawings so that those skilled in the art can easily carry them out. The present disclosure can be modified in various different ways, and is not limited to the embodiments set forth herein.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity. Meanwhile, similarly to the case where it is described as being located "on" or "above" another part, the case where it is described as being located "below" or "under" another part will also be understood with reference to the above-mentioned contents.

Further, throughout the description, when referred to as "planar", it means when a target portion is viewed from the upper side, and when referred to as "cross-sectional", it means when a target portion is viewed from the side of a cross section cut vertically.

Throughout the description, when a portion is referred to as "including" or "comprising" a certain component, it means that the portion can further include other components, without excluding the other components, unless otherwise stated. Throughout the specification, unless stated otherwise, each element may be singular or plural.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both A and B unless expressly stated otherwise, and "C to D" refers to C or greater and D or smaller unless expressly stated otherwise.

Hereinafter, a system and a method for extracting active material residue as well as a method of coating an electrode with an active material layer for manufacturing a battery and a corresponding assembly are described with reference to the accompanying drawings.

The skilled person understands that any optical parameters referred to herein such as "transparent", "translucent", etc., refer to properties or light in the spectrum visible to the human eye, in particular to light having a wavelength of 380 to 700 nanometers, except if expressly indicated otherwise. Spectrophotometric values may in particular be determined according to EN410-2011. The term "translucent" may generally be understood in that a translucent object allows the passage of light but not a clear view of what lies beyond.

It is an objective of the present disclosure to overcome the disadvantages of the conventional techniques, in particular to provide a floor assembly configured to act as a display having a high image quality and excellent optical appearance while also providing a safe and stable ground for athletes to compete on.

Accordingly, one aspect of the present disclosure relates to relates to a floor assembly comprising an array of display devices and a composite glass floor panel. The display devices face in an upward direction. The composite glass floor panel is arranged above the array of display devices. According to the present disclosure, the composite glass floor panel may be translucent and may comprise a light diffusion layer. The floor assembly according to the present disclosure may preferably be a sports floor assembly. A sports floor assembly is configured for athletes to perform their respective sport thereon (e.g. badminton, basketball, handball, field hockey, soccer, squash, tennis, volleyball). The sports floor assembly may be configured to form part or all of a playing field in a sports arena.

In particular, the display devices face in an upward direction. The skilled person understands that the upward direction refers to a vertically upward direction. The vertical direction may be defined corresponding to the direction of gravity. The array of display devices may for example comprise an LED display screen. The LED display device may comprise a flat panel display. The array may be composed of a plurality of LED display devices arranged in sequence. The array may comprise a plurality of display devices (cabinets) connected by splicing in a first (lengthwise) horizontal direction and splicing in a second (crosswise) horizontal direction to realize an array of display devices. The first horizontal direction may be perpendicular with respect to the second horizontal direction. The first and second horizontal directions may be perpendicular to the vertical direction. The array may realize a large-screen display. By providing the sports floor assembly with the array, the sports arena may realize one large-screen displays or include one or more large-screen displays. In some embodiments, the array of display devices, in particular the mechanical structure of the array of display devices, more particularly the display devices including a flat panel display supported by a box structure, may be configured based on CN 108 682 320 A or CN 219 536 489 U. CN 108 682 320 A and CN 219 536 489 U are hereby incorporated by reference with the provision that, in accordance with the present disclosure, the LED display devices are arranged in a substantially horizontal plane rather than a plane extending horizontally and vertically. The plurality of LED display devices of the array may be directed at the composite glass floor panel. The array may comprise a first number of display devices arranged sequentially in a first (lengthwise) horizontal direction, such as three, four or five display devices, all of which are covered by the same composite glass floor panel. The array may comprise a second number of display devices arranged sequentially in a second (cross-wise) horizontal direction, such as two or three display devices, all of which are covered by the same composite glass floor panel. It may be preferred that all of the display devices of a floor assembly or an assembly unit of a floor assembly are covered by the same composite glass floor panel. The first number of display devices may be equal to or larger than the second number of display devices in the array. All of the display devices may have the same shape. Each display device may in particular have a rectangular, preferably square, surface shape. The display devices may have a side length in the first horizontal direction and/or in the second horizontal direction between 10 cm and 100 cm, in particular between 20 cm and 60 cm, for example 25 cm or 50 cm. In particular, the first panel width may be a whole multiple of the first side length of the display devices covered by the panel. The second panel width may in particular be a whole multiple of the second side length of the display devices covered by the panel. The composite glass floor panel may preferably be dimensioned so as to cover the array of display devices in a substantially flush manner in the vertical direction.

The composite glass floor panel is configured to act as a floor surface for athletes to move directly thereon. In particular, the floor panel is configured for athletes to perform their respective sport thereon (e.g. badminton, basketball, handball, field hockey, soccer, squash, tennis, volleyball). The floor panel is at least sectionally translucent for light in the visible range. For example, the floor panel may be at least partially intransparent (e.g., at least partially opaque), or completely intransparent. A material will appear completely transparent if it has no properties that compete with light transmission through the material, either by (partially or completely) absorbing the light or by scattering the light in different directions. In some embodiments, most of the floor panel (e.g. at least 90%, at least 95% or at least 99% referring to the vertically oriented surface area of the floor panel) or the entire floor panel may be translucent for light in the visible spectrum. The composite glass floor panel may have a rectangular shape. The composite glass floor panel may have a substantially flat body shape. The panel thickness of the composite glass floor panel in the vertical direction may be constant. The panel thickness may be in the range of 5 mm to 30 mm, in particular 8 mm to 20 mm. The composite glass floor panel has a first width (panel length) extending in a first horizontal direction and a second width (panel width) extending in a second horizontal direction. The panel length and the panel width may be in the range of 50 cm to 500 cm. The panel length may be at least as large as the panel width. In particular, the panel length is larger than the panel width. The panel length may in some embodiments be 1 to 2 times as large as the panel width, in particular 1.2 times to 1.5 times as large. An exemplary panel length may be 1.6 m to 3 m, in particular 1.8 m to 2.5 m, more particularly 2 m. An exemplary panel width may be 1 m to 2 m, in particular 1.2 m to 1.7 m, more particularly 1.5 m. The first and second width of a panel may be substantially larger than the panel thickness. The second width may be at least 50 times as large as the panel thickness, in particular at least 100 times as large as the second width. The second width may be no more than 300 times as large as the panel thickness, in particular at least 200 times as large as the first width.

The light diffusion layer may be provided to render the composite glass floor panel translucent. The translucency properties of the composite glass floor panel may be substantially defined by the translucency properties of the light diffusion layer. Light diffusion may be understood to refer to light scattering and/or spreading out in various directions as it interacts with the light diffusion layer. Light diffusion in the light diffusion layer may cause light to disperse in different directions, in particular due to interactions with microscopic irregularities or variations in the light diffusion layer. Light diffusion in the light diffusion layer in particular differs from a direct transmission through a transparent medium, in particular a transparent base layer or a transparent intermediate layer, where light travels in a substantially straight line. The light diffusion layer exhibits light diffusion. The light diffusion layer may in particular lack clarity and/or lack transparency. The light diffusion layer is in particular configured to scatter light (light scattering layer). The composite glass floor panel may in particular be configured to have at least one light diffusion layer by roughening a surface of the panel or at least one layer thereof. The composite glass floor panel or at least one layer thereof may be eroded to have at least one roughened surface. The light diffusion layer may be created through erosion, for example through mechanical erosion, e.g. by scratching, scraping, brushing, grinding, sanding, abrasion, or the like. The light diffusion layer may include a plurality of microscopic or nanoscopic light scattering surfaces. Alternatively, or additionally, the light diffusion layer may include a plurality of light scattering particles, in particular microparticles and/or nanoparticles. With respect to the first and/or second horizontal direction, the composite glass floor panel may at least sectionally be provided with the diffusion layer. In some embodiments, most of the floor panel (e.g. at least 90%, at least 95% or at least 99% referring to the vertically oriented surface area of the floor panel) or the entire floor panel may be provided with the diffusion layer. It may be preferred that the diffusion layer covers the entire planar extension of the composite glass floor panel in the first and second horizontal direction. The area of the composite glass floor panel provided with the diffusion layer may be particularly advantageous in conjunction with some display devices, such as LED display devices, to avoid the appearance of a moiré effect. The moiré effect may occur to orderly interference of the light emitted in light cones from the individual LEDs of an LED display device. The light diffusion layer scatters (diffuses) the light emitted by the individual LEDs and thereby interrupts the light cones so that an orderly interference is avoided. The light diffusion layer creates images of high quality on the floor assembly, in particular for spectators and also for cameras which may be susceptible to the moiré effect.

The translucent composite glass floor panel covering the array may provide a rear projection surface for an image projected by the display devices, in particular the LED display screen. By providing a floor panel which is translucent above the display devices, images of field lines or other symbols emitted by the display devices appears on the surface of the floor assembly. Thereby, it appears as if the athletes stepping on the floor panel and the balls with which they play come into immediate contact with the projected image of field markings on the top surface of the sports floor assembly, regardless of the individual viewpoint of the athlete, referee, spectator or camera. By directing the display device at the composite glass floor panel, confusion regarding the question whether an athlete or ball was on one side of a projected field marking or on the other side can be avoided. The composite glass floor panel is supported by the array such that the mechanical forces acting on the panel from people standing, walking, running or jumping on the panel, balls rolling or bouncing on the panel or generally objects or people resting or moving on the floor assembly are transferred from the translucent floor panel onto the array of display devices. The display devices bear the weight of the display devices and that of objects or people on top of the panel. Additionally, the array of display devices bears the impact of any vibrations, forces or impulses, etc., acting on the panel. In particular, the composite glass floor panel may be supported by at least half of the display devices, or at least 75% or all of the display devices of the array covered by the panel. The array of display devices may support the composite glass floor panel such that the panel and the array move and/or deform together in case of an elastic displacement of the composite glass floor panel in the vertical direction. Additional support members between the composite glass floor panel and the elastic support structure can be avoided. By arranging the composite glass floor panel to be supported by the display devices, vertical gaps between the display devices and the panel, or support pillars standing on the elastic support structure provided for supporting the composite glass floor panel can be avoided, thereby improving the stability and homogeneity of the floor assembly and minimizing the risk of damages or injuries.

In some embodiments of the floor assembly, the composite glass floor panel may comprise a cover layer forming a walking surface. The cover layer may comprise or consist of the light diffusion layer. In particular, the light diffusion layer may be arranged at the top surface of the composite glass floor panel. The light diffusion layer may in particular extend from the walking surface in the thickness direction of the composite glass floor panel. The diffusion layer may have a diffusion layer thickness between 1 μm and 2 mm or between 10 μm and 1 μm. Preferably, the diffusion layer thickness may be between 5 μm and 500 μm. It may be preferred that the cover layer is partially, in particular not completely, configured to form the light diffusion layer. The diffusion layer thickness may in particular be no larger than one-half, in particular no larger than one-quarter or no larger than one tenth, of the cover layer thickness. The light diffusion layer may provide the composite glass floor panel with a matte finish. By providing the light diffusion layer in the cover layer of the composite glass floor panel, the image of field lines or other symbols emitted by the display devices are projected onto the light diffusion layer appears on the cover layer at the top surface of the floor assembly. The light diffusion layer in the composite glass floor panel covering the array may provide a rear projection surface for an image projected by the display devices, in particular the LED display screen. The athletes stepping on the floor panel and the balls with which they play come into immediate contact with the cover layer while an image of field markings is being projected onto the light diffusion layer inside of said cover layer. As the cover layer is thin, the athlete, referee, spectator or camera is unable to perceive a distance between the ball and the athletes on the composite glass floor panel and the projections appearing in the light diffusion layer therein.

In a further embodiment of the floor assembly in which the light diffusion layer is formed in the cover layer of the composite glass floor panel, the light diffusion layer is formed at a surface of the cover layer. The cover layer may be processed to have at least one roughened surface. The light diffusion layer may be created through erosion of a surface of the cover layer, for example through mechanical erosion, e.g. by scratching, scraping, brushing, grinding, sanding, abrasion, or the like. Alternatively, or additionally, the light diffusion layer may be created through chemical erosion of the cover layer. The light diffusion layer is preferably formed at the top surface of the cover layer. The light diffusion layer may in particular extend from the walking surface of the cover layer in the thickness direction thereof. In particular, the light diffusion layer thickness may extend from the top surface into the cover layer. The top surface of the cover layer faces upwards in the vertical direction. The top surface of the cover layer faces away from the display devices. Alternatively, the light diffusion layer may be formed at the lower surface of the cover layer. The lower surface of the cover layer faces downwards in the vertical direction. The lower surface of the cover layer may interface with the intermediate layer of the composite glass floor panel. The lower surface of the cover layer faces towards the display devices. Arranging the light diffusion layer at a surface of the cover layer allows to use simple manufacturing methods, such as surface treatment methods, to turn the cover layer and eventually the composite glass floor panel translucent. For ease of handling, it may be preferred to conduct such a surface treatment on the composite glass floor panel, thereby modifying the top surface of the cover layer. The light diffusion layer may for example be produced by sandblasting the cover layer. In case the light diffusion layer is arranged immediately at the top surface of the cover layer, the image of field markings projected by the display devices also appears directly at said top surface of the composite glass floor assembly.

In a further development of the floor assembly, the light diffusion layer may be formed by etching most or all of the surface, in particular the top surface, of the cover layer. The light diffusion layer may be made by etching the cover layer of the composite glass floor panel, for instance with an acid or base. The cover layer can be provided with microscopic and/or nanoscopic light scattering surfaces through etching cover layer. The thickness of the light diffusion layer in the cover layer may in particular correspond to an etching depth of an etching process performed on the cover layer or composite glass floor panel.

In some embodiments of a floor assembly, the composite glass floor panel may have a light transmission in the range of 40% to 95%. The light transmission may be 50% to 90%, in particular 70% to 88% or 80% to 87%. The light transmission may in particular be configured at 86±1%. A floor assembly having a high light transmission rate may be preferred in some applications where particularly bright or brilliant images are desired.

Another aspect of the present disclosure relates to relates to a floor assembly comprising an array of display devices and a composite glass floor panel. The display devices face in an upward direction. The composite glass floor panel is arranged above the array of display devices. The composite glass floor panel of the floor assembly is translucent. The light transmission may in particular refer to light of the visible spectrum transmitted through the composite class floor panel (in the thickness direction thereof). The test beam (test ray) for determining the light transmission may in particular be orthogonal to the composite glass floor panel (parallel to the thickness direction thereof). In particular, in a test rig for determining the light transmission, an irradi-ating (influx) and a measuring (efflux) geometry may be configured to be of substantially identical right-circular conic form, with their axes on the normal to the center of composite glass floor panel, in particular of an intermediate layer thereof. The light transmission (TL) may in particular be calculated in accordance with DIN EN 410 (April 2011) (DIN EN 41", "Glass in building—Determination of lumi-nous and solar characteristics of glazing", Deutsches Institut für Normung e. V. (DIN), April, 2011) or CIE 15-2004 (CIE 15: "Technical Report: 5 Colorimetry" 3rd edition, Interna-tional Commission on Illumination (CIE), 2004). By con-figuring the composite glass floor panel with a light trans-mission of 60% or less, it is possible to display images of particularly high contrast with the floor assembly according to the present disclosure. By configuring the light transmis-sion in the described range, a high image quality can be achieved even for images including dark colors or even black appearance. However, it is advantageous to avoid configuring the light transmission with a low value below the range described hereinabove because otherwise colors may be perceived as dull or washed-out, or the overall image may appear too dark.

In some embodiments of the floor assembly, the compos-ite glass floor panel comprises or consists of a cover layer made of a first glass panel, a base layer made of a second glass panel; and intermediate layer made of at least one polymer film. It may be preferred that the intermediate layer has a light transmission in the range of 40% to 60%. The light transmission of the intermediate layer may be in the range of 45% to 55%, or, in particular, in the range of 48% to 52%. The light transmission of the intermediate layer may in some embodiments be configured to be 51±0.5% or 49±0.5%. In some embodiments, the intermediate layer may comprise or consist of at least one layer of a Vanecava® interlayer provided by Eastman Chemical Company or Solu-tia Inc. of Springfield, MA. In particular, the intermediate layer may comprise or consist of Vanecava®#0007 "Eve-ning shadow". The cover layer and/or the base layer may have a larger light transmission than the intermediate layer. In particular, the cover layer and/or the base layer may have a light transmission in the range of 60% to 99%. The light transmission of the cover layer may be 70% to 97%, in particular 85% to 95% or 87% to 90%, for example 88% or 89%. The light transmission of the cover layer may in particular be configured at 86±1%. It is advantageous to provide the light diffusion layer in a different layer of the composite glass floor panel than the layer causing a reduced light transmission. In particular in embodiments in which the light diffusion layer providing the composite glass floor panel with translucency is arranged in the cover layer, it may be advantageous to have a lower layer, in particular the intermediate layer, to provide a reduced light transmission rate in comparison to the cover layer, to obtain superior image quality.

The first and second aspects of the present disclosure may be combined with one another. Alternatively, or additionally, the third aspect of the present disclosure may be combined with either one of the first and second aspects, or both. In embodiments containing implementing the second and third aspect, alight diffusion layer may be omitted. Alternatively, the second and third aspect may be combined with the embodiments providing a rear projection surface in the composite glass floor panel.

A further aspect of the present disclosure relates to relates to a floor assembly comprising an array of display devices and a plurality of composite glass floor panels. The glass floor panels are translucent and arranged above the array of display devices. The display devices face in an upward direction. The composite glass floor panel is arranged above the array of display devices. A plurality of composite glass floor panels of a floor assembly may be arranged to form pairs of adjacent composite glass floor panels. In some embodiments, a plurality of assembly units of a floor assem-bly may be arranged to form pairs of adjacent composite glass floor panels. According to the present disclosure, a gap may be defined between each pair of adjacent composite glass floor panels. The gap is preferably linear. The gap has a gap length corresponding to the length of the pair of adjacent panels. A gap width is defined by the distance between the pair of adjacent panels. The gap width may be constant along the gap length. The gap may in particular be filled with a sealing member. The provision of a sealing member in the gap may be desired to avoid contamination of the display devices below with dirt or fluid, may protect adjacent glass floor panels from contacting each other and may improve the safety of the floor assembly against inju-ries. The adhesive may be arranged in the gap above the sealing cord. The sealing member, in particular the sealing cord and/or, in particular and, the elastic adhesive, may be optically clear. In some embodiments of the floor assembly, the elastic adhesive of the sealing member may comprise or consist of Novasil S-SP 6764 (components mixed at the appropriate ratio) by Hermann Otto, Fridolfing. The opti-cally clear sealing member may in particular be configured to have a light transmission rate the same as or larger than at least one or more, in particular all, of the composite glass panels adjacent to the gap in which the sealing member is situated. The optically clear sealing member may have the same or substantially the same translucency properties as the adjacent composite glass floor panels. The light transmission of the optically clear sealing member may be no less than 0. times as large as, is in particular no less than 0.9 times, more particularly no less than 0.95 times the light transmission of at least one or both of the adjacent composite glass floor panels. If the sealing member transmits substantially less light than the adjacent panels, the image generated by the array of display devices becomes visibly interrupted. Alter-natively, or additionally, the light transmission of the opti-cally clear sealing member may be no more than 1.05 times as large as, is in particular no more than 1.1 times as large as, more particularly no more than 1.25 times as large as large as the light transmission of at least one or both of the adjacent composite glass floor panels. If the sealing member is substantially more transparent than the adjacent panels, light from the light sources below would visibly leak through the gaps which would disturb an image generated by the floor assembly and possibly disturb athletes, referees or spectators. By selecting an optically clear sealing member of similar transparency and light transmission in comparison to the adjacent composite glass floor panels, the sealing mem-ber becomes virtually invisible for spectators watching an event on the floor assembly while the display devices are used to create an image. Thus, the use of an optically clear sealing member allows the floor assembly to have a very good image quality.

In some embodiments of the floor assembly, the optically clear sealing member may have a light transmission rate in the range of 60% to 99%. It is preferred that light transmission rate of the sealing member is at least 80% or at least 90%, in particular at least 93%. The light transmission rate of the sealing member may in particular be in the range 75% to 97%, preferably in the range of 90% to 95%. The optically clear sealing member may have the same or a higher transparency than the adjacent composite glass floor panels.

The gap between some, in particular most, preferably all, pairs of adjacent composite glass floor panels in the floor assembly may in some embodiments be have a gap width in the range of 0.5 mm to 5 mm. In particular, the gap width may be in the range of 1 mm to 3 mm. More particularly, the gap width may be in the range of 1.5 mm to 2.5 mm. An exemplary average gap width may be 2±0.2 mm. Larger gap widths may be detrimental to image quality. Smaller gap widths pose a risk of collisions between adjacent composite glass floor panels which in turn may cause catastrophic damage to a panel.

In some embodiments of the floor assembly, the sealing member comprises a sealing tube or sealing cord pinched between the pair of adjacent glass floor panels. Alternatively, or additionally, the sealing member may comprise an elastic adhesive, such as a silicone adhesive, arranged in the gap, in particular a silicone adhesive cured from a two-component mixture inside of the gap. The elastic adhesive may in particular be arranged in the gap above the sealing tube or sealing cord. The elastic adhesive may be injected into the gap after the sealing tube or cord has been inserted.

In some embodiments of the floor assembly, the composite glass floor panel comprises or consists of a cover layer made of a first glass panel, a base layer made of a second glass panel; and intermediate layer made of at least one polymer film. The first glass panel may in particular be made of security glass according to EN 12150 (DIN EN 12150-1, "Glass in building—Thermally toughened soda lime silicate safety glass—Part 1: Definition and description", Deutsches Institut für Normung e.V. (DIN), July 2020; DIN EN 12150-2:2005, "Glass in building—Thermally toughened soda lime silicate safety glass", Deutsches Institut für Normung e.V. (DIN), January 2005), in particular SGG Security®. The second glass panel may in particular be made of security glass according to EN 12150 (see above), in particular SGG Security®. The composite glass floor panel may comprise one or more additional layers between the cover layer and the base layer. Optionally, the composite glass floor panel may comprise one or more additional layers arranged below the base layer. It may be preferred that the intermediate layer is bonded between two layers of glass. The intermediate layer may be bonded directly to the cover layer. The intermediate layer may be bonded directly to the base layer. The intermediate layer may be arranged, in particular directly, on the bottom of the cover layer. The base layer may be arranged, in particular directly, on the bottom of the intermediate layer. Such a preferably three-layered composite glass floor panel may be able to provide the floor assembly with a particularly advantageous combination of mechanical and optical properties.

In some embodiments, the at least one polymer film of the intermediate layer comprises or consists of at least one of polyvinyl butyral (PVB), ethylene-vinyl acetate (EVA), ionoplast polymers, cast in place (CIP) liquid resin, and thermoplastic polyurethane (TPU). In particular, the at least one polymer film further comprises a colorant. The polymer film may be provided with at least one colorant to set the light transmission rate of the intermediate layer, in particular of the composite glass floor panel. The skilled person understands that the polymer film may comprise additional additives.

In some embodiments of the floor assembly according to the present disclosure, the thickness of the composite glass floor panel may be in the range of 8 mm to 15 mm, in particular in the range between 10 mm and 13 mm, preferably in the range 11 mm to 12 mm. Larger glass floor panels tend to be increasingly heavy and stiff. Thinner glass floor panels are increasingly susceptible to mechanical damage. The thickness of the cover layer may be in the range of 4 mm to 6 mm, in particular in the range between 4.5 mm and 5.5 mm, preferably 5 mm. The thickness of the intermediate layer may be in the range of 0.5 mm to 3.0 mm, in particular in the range between 1.0 mm and 2.0 mm, preferably 1.4 mm to 1.6 mm. The thickness of the base layer may be in the range of 4 mm to 6 mm, in particular in the range between 4.5 mm and 5.5 mm, preferably 5 mm. It may be preferred that the thickness of the cover layer is substantially equal to the thickness of the base layer. The thickness of the intermediate layer may be smaller than the thickness of the cover layer and/or smaller than the thickness of the base layer. In particular, the thickness of the intermediate layer may be smaller than one half of the thickness of the cover layer and/or smaller than one half of the thickness of the base layer.

In some embodiments of the floor assembly, the cover layer is provided, in particular on its top surface, with a pattern, in particular a regular pattern, of glass dots or ceramic dots. Dots may in particular comprise or consist of a translucent material. Optionally, dots may comprise or consist of a reflective material, in particular comprise reflective microparticles, such as silver microparticles. The dots may in some embodiments have a circular shape. The dots are distanced from each other and the dots define an average dot diameter. The distance between adjacent dots is may be larger than the average dot diameter. In some embodiments, the distance between adjacent dots may be smaller than the average dot diameter. The distance between adjacent dots (e.g. in a row of dots or in a column of dots) may be determined as the distance between the center of two immediately adjacent dots (dot pitch).

The distance between adjacent dots (dot pitch) may be configured to be in the range between 2 mm and 15 mm, in particular in the range between 3 mm and 10 mm, more particularly in the range between 5 mm and 8 mm. It may be preferred if the distance between adjacent dots is no more than 10 mm, in particular no more than 8 mm or no more than 7 mm. In some embodiments, the distance between adjacent dots may be between 6 mm and 7 mm, in particular 6.4 mm.

The average dot diameter may be in the range of 0.1 mm to 15 mm, in particular in the range of 0.5 mm to 11 mm. In some embodiments, for example in case the floor assembly is configured to be used as a basketball playing field, the average dot diameter may be in the range of 0.4 mm to 1.5 mm, in particularly 0.6 mm to 1 mm, more particularly 0.8 mm. The average diameter may for example be 0.8 mm or 1 mm. In some embodiments, for example in case the floor assembly is configured to be used as a squash playing field, the average dot diameter may be in the range of 2 mm to 10 mm, in particularly 2.5 mm to 5 mm. The average diameter may for example be 2.5 mm, 3 mm, 3.5 mm or 5 mm. In some embodiments, such as outdoor playing fields, the average dot diameter may be in the range of 5 mm to 15 mm, in particularly 8 mm to 12 mm, more particularly 8 mm to 10 mm. For some playing fields (e.g. a squash field) it may be desired to have a first region (e.g. playing region) with a medium grip using medium sized dots, for example of 2.5 mm diameter, and a second region (e.g. a border region) having a strong grip using larger dot diameters, of for example 5 mm. Dots of such a size and spread on the one hand improve grip for athletes to move safely while not affecting the optical quality of the floor assembly. However, depending on the application, it may be desired not to increase the grip above a certain threshold.

It may be preferred that the dots in a row or column have a constant average diameter and/or constant pitch. In particular, it may be preferred if the glass floor panel is provided exclusively with dots of constant shape and size, in particular of the same average diameter. Alternatively, or additionally, it may be preferred if the glass floor panel is provided exclusively with regularly spaced dots, in particular dots arranged in columns of a constant dot pitch and/or row of a constant dot pitch.

In some embodiments of the floor assembly, the composite glass floor panel is configured to have a light reflection rate in the range of 0.03 to 0.10, in particular in the range of 0.04 to 0.08, preferably in the range of 0.05 to 0.07. The light transmission rate may in particular be measured at an impact angle of 8° (in particular in accordance to the method defined in EN 410-2011 (see above)). Alternatively, the light transmission rate may be measured at an inclination of 85° (in particular in accordance to the method defined in EN 13745-2006 (DIN EN 13745, "Surfaces for sports areas—Determination of specular reflectance", Deutsches Institut für Normung e.V. (DIN), May 2004)). It was found that floor assemblies having a reflection angle in the above-mentioned range cause less irritation to athletes and spectators. The floor assembly and a particularly low light reflection rate so that the field markings and the like created by the display devices can be perceived easily.

In some embodiments of the floor assembly, the composite glass floor panel is configured to have a mirror gloss of less than 15%, in particular less than 10%, preferably in the range of 3% to 7%, more preferably in the range 4% to 6%. The mirror gloss may in particular be approximately 5%. The mirror gloss may be measured at an inclination of 85° (in particular in accordance to the method defined in EN 2813-2015 (DIN EN ISO 2813, "Paints and varnishes—Determination of gloss value at 20°, 60° and 85° (ISO 2813:2014)", Deutsches Institut für Normung e.V. (DIN), February 2015)). The floor assembly has a particularly low mirror gloss so that the field markings and the like created by the display devices can be perceived easily and so that athletes and referees are not irritated by gloss.

In some embodiments of the floor assembly, the composite glass floor panel, in particular the top surface thereof, is configured to have a slip resistance value (linear friction coefficient) in the range of 85 to 105, in particular in the range of 85 to 100, preferably in the range of 88 to 98. The friction coefficient may in particular be 89 or 95. The friction coefficient may be determined using a CEN rubber under dry conditions at a temperature of 23±2° C. (in particular in accordance to the method defined in EN 13036-4:2011 (DIN EN 13036-4, "Road and airfield surface characteristics Test methods Part 4: Method for measurement of slip/skid resistance of a surface: The pendulum test", Deutsches Institut für Normung e. V.; Deutsches Institut für Normung e. V. (DIN), December 2011)).

In some embodiments of the floor assembly, the composite glass floor panel is configured to have a ball rebound value of at least 90%, in particular at least 93%, preferably at least 95%. The ball rebound value may be determined by releasing a basketball from 1.8 m above the floor assembly, in comparison to a reference rebound value of said basketball on concrete (in particular in accordance to the method defined in EN 12235:2013 (DIN EN 12235, "Surfaces for sports areas—Determination of vertical ball behaviour", Deutsches Institut für Normung e. V.; Deutsches Institut für Normung e. V. (DIN), December 2013)).

In some embodiments of the floor assembly is configured to have an area-elastic vertical deformation value in the range of 1 mm to 4 mm, in particular in the range of 1.5 mm to 3.5 mm. The area-elastic vertical deformation value may be 2 mm or 3.2 mm. The deformation may be determined in millimeters under a standard load of 1500 N, in particular according to EN 14809 (DIN EN 14809; "Surfaces for sports areas-Determination of vertical deformation—Corrigendum 1", Deutsches Institut für Normung e. V.; Deutsches Institut für Normung e. V. (DIN), April 2008).

In some embodiments of the floor assembly is configured to have an area-elastic force reduction value in the range of 40% to 60%, in particular in the range 45% to 55%. The force reduction value may in particular be 50%. The force reduction value may be determined in accordance with EN 14808 (DIN EN 14904:2006; DIN EN 14808, "Surfaces for sports areas—Determination of shock absorption", Deutsches Institut für Normung e. V.; Deutsches Institut für Normung e. V. (DIN), March 2006; DIN EN 14904:2006, "Sportböden—Mehrzweck-Sporthallenböden", Deutsches Institut für Normung e. V. (DIN), June 2006).

In particular, the composite glass floor panel rests directly on the array of display devices. For example, the composite glass floor panel may rest directly on an LED display device. An LED display device may comprise a flat panel display including protrusions, such as pillars, dam-like protrusions or wall-like protrusions, interposed between an array of light emitting diodes (LEDs). The LEDs may be arranged in grooves or similar retractions, below the tip of the protrusions of the LED display device. The translucent surface panel may rest directly on top of a plurality of protrusions of the LED display device.

In an exemplary embodiment of a floor assembly, the array of display devices is mounted on an elastic support structure. The elastic support structure may be configured to resiliently mount the composite glass floor panel on top of the array of display devices. The elastic support structure provides elasticity in the vertical direction to the floor assembly. In the vertical direction, the elastic support structure may be as elastic as or more elastic than the composite glass floor panel. The elastic support structure is more elastic in the vertical direction than the array of display devices. In particular, the elastic support structure is arranged below predefined sections of the array and/or of the translucent floor panel. The display devices may in particular be mounted on the elastic support structure such that an elastic displacement of the composite glass floor panel supported by the array causes a corresponding elastic deformation of the elastic support structure. The elasticity of the elastic support mount in the vertical direction may be at least as large as or larger than, in particular substantially larger than, the elasticity of the array of display devices. The elasticity of the elastic support mount in the vertical direction may be at least as large as or larger than, in particular substantially larger than, the elasticity of the composite glass floor panel. The elastic support structure is configured to provide for all or at least the majority of a local vertical deformation of the floor assembly. A vertical deformation, in particular constriction, of the floor assembly in comparison to a resting state thereof may cause a corresponding vertical deformation of the elastic support structure, wherein the vertical deformation of the support structure is at least 50% of the total vertical deformation experienced locally by the floor assembly, in particular at least 75% or at least 90% thereof.

The floor assembly may in particular comprise a plurality of assembly units. The assembly units of the floor assembly may be uniform, i.e. of the same design and size, or at least substantially of the same design and size. Each assembly unit may comprise a respective elastic support structure, a respective array of display devices mounted on the elastic support structure, and a respective composite glass floor panel. The assembly units of the floor assembly are arranged in rows and columns. The composite glass floor panels of the plurality of assembly units are configured to be arranged to form a smooth surface. In particular, the floor panels of the plurality of assembly units are arranged flush in the first horizontal direction and in the second horizontal direction so as to form a level playing field. In an exemplary embodiment, the floor assembly may include a plurality of arrays covered by a corresponding plurality of composite glass floor panels. Each assembly unit may be handled, in particular transported, stored and/or set up, individually. For example, each assembly unit may be transported individually as a complete unit using a conventional forklift. Several assembly units may be stacked on top of each other for storage or transportation in a freight container (e.g. on a truck or ship). Dividing the floor assembly into multiple individual assembly units allows for a rapid assembly and disassembly which is important for using the floor assembly in an event location. Furthermore, a floor assembly consisting of multiple assembly units allows to quickly replace faulty components without long impairments to the playing field. The use of uniform assembly units allows to create a playing field which is safe to use for athletes and displays homogeneous behavior.

In an exemplary embodiment of a floor assembly, in particular comprising a plurality of assembly units, the assembly units are attached to each other. Such a plurality of assembly units may be firmly coupled to one another. In particular, the arrays of display devices may be spliced together using connecting members. The connecting members may be configured to releasably connect adjacent assembly units, in particular assembly units directly adjacent to each other in the first horizontal direction, or assembly units directly adjacent to each other in the second horizontal direction. The connecting members may be provided to splice display devices of adjacent assembly units together. In particular, the connecting members may be configured to splice box structures of adjacent assembly units together. A first group of connecting members may be provided inside of each assembly unit for splicing the box structures of the respective assembly of display devices of a respective assembly unit together. The first group of connecting members may be configured in accordance with a fixing mechanism or latching pin of CN 108682320 A or in accordance with a lock rod of CN219536489U.

In some embodiments of the floor assembly, which may comprise a plurality of assembly units, the floor assembly further comprises a respective rigid substructure. In particular, each assembly unit may include a respective each assembly unit.

Each single glass floor panel may be associated with one single respective rigid substructure. In particular, one respective glass floor panel, may be associated with the respective rigid substructure in each assembly unit. Each assembly unit may comprise a respective array of display devices covered by the respective composite glass floor panel of the assembly unit. The arrays of display devices may in particular each be sandwiched between the composite glass floor panel and a rigid substructure. The array of display devices of an assembly unit is sandwiched between the composite glass floor panel and the rigid substructure.

FIG. 1 shows a schematic illustration of a floor assembly 10. For ease of intelligibility, the floor assembly will generally be referred to as a sports floor assembly. However, it shall be clear that the floor assembly can be applied outside of sports applications, for example as an interactive floor assembly for a stage or the like. In one or more exemplary embodiments, the floor assembly may be used as a sports floor assembly. The sports floor assembly 10 has a layered structure. The sports floor assembly 100 may comprise several layers stacked on top of one another in a vertical direction Z. The top of the sports floor assembly is provided by a composite glass floor panel 100. The composite glass floor panel 100 is arranged on top of an array 200 of display devices. The display devices may be mounted on an elastic support structure 300. A rigid substructure 400 may form at the bottom of the sports floor assembly 100.

The composite glass floor panel 100 may comprise multiple panel layers. For example, the surface panel 100 may consist of a cover layer 110, and intermediate layer 120 and a base layer 130. The intermediate layer 120 may be sandwiched between the cover layer 110 and the base layer 130. In order to render the surface panel 100 optically translucent, it may comprise a light diffusion layer 111. The light diffusion layer 111 may be integrated the cover layer 110, as shown in FIGS. 1 and 3, alternatively, or additionally, the intermediate layer 120 or the base layer 130 may include or light diffusion layer 111.

The array 200 of display devices, which is explained in further detail with respect to FIGS. 5 and 8, comprises a plurality of display devices facing upward in the vertical direction Z. The array 200 of display devices covered by the composite glass floor panel 100. The composite glass floor panel 100 and the display devices may in particular be adapted to one another such that the composite glass floor panel 100 covers all of the display devices 210 of one array 200 completely. The sports floor assembly 10 may comprise an array 200 including several rows of display devices 210 and several columns of display devices 210. The sports floor assembly 10 shown in FIG. 8, for example, includes 15 display devices 210 joined together as one array 200. The exemplary embodiment shown in FIG. 8 shows the array 200 comprising three adjacent rows of display devices 210 arranged immediately adjacent one another in a first, lengthwise horizontal direction X. In the sports floor assembly 10 shown in FIG. 8 has an array 200 comprising four adjacent columns of display devices 210 arranged immediately adjacent one another in a second, crosswise horizontal direction Y.

The elastic support structure 300 may be provided below the composite glass floor panel 100 and the array 200. The elastic support structure 300 may be configured to provide elastic properties to the sports floor assembly 10 in the vertical direction Z. The elastic support structure 300 mounts the array 200 display devices 210 of the sports floor assembly 10. As shown in FIG. 1 or 5, the composite glass floor panel 100 rests directly on top of the array 200 of display devices 210. The elastic support structure 300 and the display devices may in particular be adapted to one another such that the elastic support structure 300 is entirely covered by the array 200. The elasticity of the elastic support structure 300 and the vertical direction Z may be substantially larger than the elasticity of the composite glass floor panel 100 and the vertical direction and/or than the elasticity of the array 200 and the vertical direction Z.

In the illustrated embodiment of a sports floor assembly 10, the array 200 is vertically interposed between the composite glass floor panel 100 and the elastic support structure 300.

Furthermore, the sports floor assembly may be equipped with a rigid substructure 400. The rigid substructure is explained in further detail with respect to FIG. 8. The composite glass floor panel 100, the array 200 and the elastic support structure 300 may be situated on top of the rigid substructure 400. The elastic support structure 300 has an elasticity in the vertical direction Z substantially larger than the elasticity of the rigid substructure 400 and the vertical direction Z. For example, the rigid substructure 400 may be realized as a framework made of metal sheets and/or molded metal parts. The rigid substructure 400 may comprise an integrally formed solid body. The rigid substructure 400 may be configured to be placed on a floor surface in a sports arena or generally an event location. The rigid substructure 400 may be provided with a plurality of legs 420, such as the legs 420 of embodiments shown in FIG. 5 or 11. For example four legs 420 may be arranged in four corners of a sports floor assembly 10 of cubic shape. One or more of the plurality of legs 420 may be height adjustable to accommodate for unevenness of the ground below the sports floor assembly 10.

The sports floor assembly 10 may be designed to be assembled from a multitude of like or identical assembly units 11, such as shown in FIG. 2. Each assembly unit 11 may include one composite glass floor panel 100, one array 200 of display devices, one elastic support structure 301 rigid substructure 400. The components of each assembly unit 11 may be dimensioned to fit below one another in the vertical direction Z in a substantially congruent manner. In the exemplary embodiment illustrated in the figures, the assembly unit 11 has a rectangular cross-section and the unit's components have the same rectangular cross-section.

The exemplary assembly unit 11 has a unit length $l_X$ in the first, lengthwise horizontal direction X of 2 m and a unit width $l_Y$ in the second, crosswise horizontal direction Y of 1.5 m, indicated in FIG. 10. The length and width of the composite glass floor panel 100 may correspond to the unit length and unit width. The length and width of the array 200 may correspond to the unit length and unit width. The length and width of the elastic support unit 300 may correspond to the unit length and unit width. The length and width of the substructure 400 may correspond to the unit length and unit width.

The sports floor assembly 10 or assembly unit 11 may be handled with conventional transportation means (e.g. a forklift) engaging the rigid substructure. The rigid substructure 400 may be configured to be contacted by transportation tools. For example, the rigid substructure 400 may be provided with receptions 430 for forks of a forklift.

FIGS. 3 and 4 show schematic illustrations of composite glass floor panels 100. Composite glass floor panels 100 may for example comprise at least one polymer material, such polyvinyl butyral (PVB), ethylene-vinyl acetate (EVA), ionoplast polymers, cast in place (CIP) liquid resin, polymethylmethacrylate (PMMA, plexiglas) and/or thermoplastic polyurethane (TPU). The composite glass floor panel may comprise at least one glass material, in particular security glass according to EN 12150, in particular SGG Securit®. A glass panel may be particularly wear resistant.

FIG. 3 illustrates a composite glass floor panel 100 comprising several layers, such as a cover layer 110, a base layer 130 and an intermediate layer 120 interposed between the cover layer 110 and the base layer 130. The composite glass floor panel 100 extends in a planar manner in the first and second horizontal directions X, Y. The cover layer 110 is arranged above the intermediate layer 120 in the vertical direction Z. The intermediate layer 120 is arranged above the base layer 130 in the vertical direction Z. The cover layer 110 may be made of a first glass panel. The base layer 130 may be made of a second glass panel. The intermediate layer 120 may comprise or consist of at least one polymer film. The cover layer 110, the intermediate layer 120 the base layer 130 are sequentially laminated to form the composite glass panel 100. The intermediate layer 120 may in particular be a PVB-polymer film. The polymer intermediate layer 120 may be bonded between the cover layer 110 and the base layer 130 which may in particular be made of a glass material.

The composite glass floor panel 100 provides a walking surface for athletes. The walking surface is realized by the cover layer 110 of the panel. As shown in FIG. 2, the cover layer 110 of the sports floor assembly 10 has a top surface 101 exposed to the environment. Ceramic dots 150 or the like may be burned into the top surface 101 of the glass floor panel 100 to improve grip.

Schematic perspective views from an elevated point of view of glass floor panels 100 with differently sized dots 150 are shown in FIGS. 12 and 13. The dots may be of a small average diameter m and scattered apart so as not to impair the optical appearance of the sports floor assembly 10. The average dot diameter m may in particular be 10 mm or less.

In the example shown in FIG. 12, the dot size is 5 mm and the horizontal distance between adjacent dots 150 is slightly larger than the average diameter m of the dots 150. In the embodiment shown in FIG. 12, the horizontal distance is defined as a regular pitch p of 6.4 mm. In further embodiments, the average dot diameter may for example be 2.5 mm, 3 mm or 3.5 mm.

In the example shown in FIG. 13, the dot size is 0.8 mm and the horizontal distance between adjacent dots 150 is much larger than the average diameter m of the dots 150. In the embodiment shown in FIG. 13, the horizontal distance is defined as a regular pitch p of 6.4 mm.

Alternatively, it is conceivable that the dots 150 may be spaced apart so far that the person walking on the sports floor assembly 10 touches several of the dots 150. For example, the distance between two adjacent dots 150 may be approximately 2.5 cm or approximately 1.25 cm.

In one or more exemplary embodiments, the dots 150 may be arranged in a regular pattern on the top surface 101 of the floor assembly 10. Such a pattern may have a constant dot diameter m and the same dot pitch p in two perpendicular horizontal directions. The sports floor assembly 10 may be configured to have a slip resistance value (linear friction coefficient) in the range of 88 to 98. The friction coefficient may be determined using a CEN rubber under dry conditions at a temperature of 23±2° C. (in particular in accordance to the method defined in EN 13036-4:2011).

The composite glass floor panel 100 has a panel thickness t defined in the vertical direction Z. The panel thickness t may be in the range of 10 mm to 13 mm, in particular in the range 11 mm to 12 mm. The cover layer 110 has a (cover layer) thickness a. The cover layer thickness a may be in the range of 4.5 mm to 5.5 mm, in particular 5 mm. The base layer 110 has a (base layer) thickness c. The base layer thickness c may be in the range of 4.5 mm to 5.5 mm, in particular 5 mm. In one or more exemplary embodiments, the thickness of the cover layer may be substantially equal to the thickness of the base layer. The thickness b of the intermediate layer 120 may be smaller than the thickness a of the cover layer 110 and/or smaller than the thickness c of the base layer 130. The thickness b of the intermediate layer may be between 1.0 mm and 2.0 mm, in particular 1.4 mm to 1.6 mm.

The composite glass floor panel 100 may be provided with a light diffusion layer 111. A light diffusion layer 111 may be provided to render the composite glass floor panel 100 opaque but light transmissive. In case a composite glass floor panel 100 provided with a light diffusion layer 111 is arranged on top of the upward facing displays devices 210 of the array 200, the panel 100 and in particular its light diffusion layer serve as a rear projection surface for the light emitted by the display devices to form an image at the top surface of the sports floor assembly 10.

A surface treatment may be performed on the cover layer 110 to form the light diffusion layer 111. The light diffusion layer 111 may be formed at the top surface of the cover layer 100 facing away from the display devices 210. The light diffusion layer 111 may extend into the composite glass floor panel 100 beginning at the top surface thereof. The cover layer 110 may be configured such that the light diffusion layer 111 extends only partially through part of the cover layer 110 in the vertical direction Z. The light diffusion layer 111 may have a thickness d smaller than the cover layer thickness a. The diffusion layer thickness d may be no larger than 2 mm, in particular no larger than 1 mm or no larger than 100 μm. The cover layer 110 may for example be modified by acid etching to form the light diffusion layer 111 therein. The light diffusion layer 111 may extend (e.g., continuously) over the entire top surface of the composite glass floor 100 in the first and second horizontal direction. The translucent surface panel, in particular the composite glass floor panel 100, may be provided with a matte surface finish. The panel may have a mirror gloss of less than 7%, in particular according to EN ISO 2813. The panel may have a light reflection rate in the range of 0.05 to 0.07, in particular according to EN 410 and/or EN 13745.

The composite glass floor panel 100 may have a light transmission in the range of 40% to 95%. In some embodiments of a sports floor assembly 10, the light transmission through the composite glass floor assembly 100 in the vertical direction Z may be 70% to 90%. The light transmission of the glass floor panel 100 may in particular be configured to be 86±1%. A sports floor assembly having such a high light transmission rate may be preferred in some applications where particularly bright or brilliant images are desired.

Alternatively, the composite glass floor panel 100 may in some embodiments have a light transmission through the composite glass floor assembly 100 in the vertical direction Z in the range of 40% to 60%. The light transmission rate of the glass floor assembly 100 may be reduced. The light transmission of the glass floor panel 100 may in particular be in the range of 50% to 52%. The light transmission may in some embodiments be configured to be 51±0.5%. The light transmission (TL) may in particular be calculated in accordance with DIN EN 410 (April 2011) (DIN EN 41", "Glass in building—Determination of luminous and solar characteristics of glazing", Deutsches Institut für Normung e. V. (DIN), April, 2011) or CIE (15-2004) (CIE 15: "Technical Report: Colorimetry" 3rd edition, International Commission on Illumination (CIE), 2004). By configuring the composite glass floor panel 100 with a low light transmission of 60% or less, it is possible to display images of particularly high contrast with the sports floor assembly 10 according to the present disclosure. By configuring the light transmission in the described range, a high image quality can be achieved even for images including dark colors or even black appearance. However, it is advantageous to avoid configuring the light transmission with a low value below the range described hereinabove because otherwise colors may be perceived as dull or washed-out, or the overall image may appear too dark.

The composite glass floor panel 100 may use the intermediate layer 120 to define the overall light transmission rate. I.e., the cover layer and/or the base layer may have a larger light transmission than the intermediate layer. The light transmission rate of the intermediate layer 120 may be in the range of 45% to 55%, or, in particular, in the range of 50% to 52%. The light transmission rate of the intermediate layer 120 may be determined by addition of a colorant to the polymer film used in the intermediate layer 120.

FIG. 4 shows a schematic view of a pair of glass floor panels 100 arranged immediately adjacent to one another in the lengthwise direction X from a lowered point of view. A gap 160 is formed between the floor panels 100. The gap 160 extends in the crosswise direction Y. The gap 160 may have a gap width of 2 mm. The gap width may be constant in the crosswise direction Y along the entire length of the panels 100 adjacent to the gap. A gap 160 may be provided to avoid pairs of immediately adjacent panels 100 from colliding.

A sealing member 170 may be provided inside of the gap 160. The sealing member 170 may include a sealing cord 171. Additionally, or alternatively, the sealing member 170 may include an elastic adhesive 172. The elastic adhesive may in particular be a two-component silicone cured inside of the gap 160. The sealing member 170 renders the top surface of the sports floor assembly 10 smooth and protects the layers below the composite glass floor panel 100 from water and dirt from the playing field. The sealing member 170 forms a mechanical barrier between adjacent floor panels to avoid a glass-glass interface. The sealing member 170 may be optically clear. An optically clear sealing member 170 may in particular be have a larger light transmission rate than all of the directly adjacent panels.

FIG. 5 shows a partial side view of the sports floor assembly 10. FIG. 8 shows a perspective view of the sports floor assembly 10 in which the glass floor panel and some of the display devices 210 of the array 200 are not shown to allow a better understanding of the structure of the sports floor assembly. FIG. 9 shows a perspective view illustrating only the elastic support structure 300 and the rigid substructure 400 of a sports floor assembly according to some embodiments of the present disclosure.

In FIG. 5, the array 200 of display devices 210 is arranged in the vertical direction Z on top of the elastic support structure 300 which, in turn is carried by the rigid substructure 400. The composite glass floor panel 100 rests directly on top of the display units 230 of the display devices 210. The display units 230 are shown in further detail in FIG. 8. The display units 230 are arranged to form a level surface extending in the first and second horizontal directions X, Y.

The display device 210 may in particular be realized as an LED display device such as schematically illustrated in FIG. 6. The display devices may comprise LED display units 230 having a flat panel surface 232 on which individual light emitting diodes (LEDs) 231 may be arranged in grooves or similar retractions 235. The individual LEDs 231 of an LED display unit 230 may be set back from its flat panel surface 232 in a downward vertical direction Z. Protrusions 233, such as pillars, dam-like protrusions or wall-like protrusions, may be interposed between a plurality of individual LEDs 231. The LEDs 231 may thus be arranged in grooves or similar retractions 235, below the surface level of the display unit 230 defined by the protrusions 233. By using a translucent panel 100 disposed above the display devices 210, the light from different adjacent LEDs 231 of the display device 210 is scattered before being emitted from the sports floor assembly 10. This allows to obfuscate shadows caused by the protrusions 233 and to prevent the appearance of a moiré effect.

The LEDs 231 emit light which travels through the translucent surface panel, which may in particular be a composite glass floor panel 100. The LEDs 231 create light-cones indicated in dotted lines shown in FIG. 6. Adjacent LEDs 231 may create light cones v overlapping within the translucent surface panel 100, in particular in the cover layer 110, more particularly in the light diffusion layer 111. The LED device 230 and the panel 100 may be adapted to ascertain that light cones v from adjacent LEDs 231 overlap within the panel 100, in particular at the level of the light diffusion layer 111 or below the light diffusion layer in the vertical direction Z. The light diffusion layer 111 is configured to cause light diffusion (i.e. scattering of light). As the composite glass floor panel 100 scatters the light s it may act as a rear projection surface for the underlying LEDs 231. The light s from the LEDs 231 leaving the panel 100 is scattered. The composite glass floor panel 100 is configured to transform light from small or even dot shaped light sources such as LEDs 231 into scattered light s (diffused light). Diffused light is light that has an even concentration across the spread of its beam (i.e. "soft light").

The display units 230 carried by respective box structures 220. A vertical cross-section of a box structure 220 is illustrated in detail in FIG. 7. Each display device 210 may comprise a box structure 220. Each box structure 220 may hold a respective display device. In some embodiments, an array 200 of box structures 220 may be provided without a display unit 230. The box structure 220 realizes rigid frame in particular for the individual display devices 210. The box structure 220 may be made of a metal material, such as aluminum or steel. In the embodiment illustrated in the figures, the box structure 220 is of a generally square shape. The display devices 210 including a flat panel display unit 230 supported by a box structure 220 may in particular be configured according to CN108 682 320A or CN219 536 489U.

Each box structure 220 is delimited by first beams 226 extending in the first horizontal direction X and second beams 227 extending in the second horizontal direction Y. The first and second beams 226, 227 are joined at the four corners 224 of the box structure 220, for example by welding. The beams 226, 227 form a square box frame. The box structure 220 is provided with the respective foot 228 in each corner 224 of the box structure. The feet 228 of the box structure 220 extends downwards in the vertical direction Z. Only the feet 228 of the display devices 210 are in contacting engagement with the elastic support structure 300. The feet 228 at the corners 224 of the display devices 210 may stand on pads 310, 320 of the elastic support structure 300, as shown in FIGS. 5 and 8.

FIG. 11 shows how box structures 220 may be interlocked so as to form an array 200 of box structures. As shown in the illustrated embodiments, the box structures 220 may each contain a display unit or part of a display unit. Alternatively, an array of box structures 220 may be provided which do not contain display units. A box structure may for example contain a panel support unit (not shown) having a flat panel surface 232 in which a composite glass floor 100 may be arranged. Referring to FIG. 6, such a panel support surface could for example be made as a support free of LEDs for supporting the composite glass panel 100.

The skilled person understands that, while assembly units 11 including a respective composite glass panel 100, and a respective array 200, as well as possibly a respective elastic support structure 300 and/or a respective rigid substructure 400 may be preferred, it may in some embodiments be preferred if the layered structure does not have a 1:1(:1:1) association thereof. For example, it may be preferred to have composite glass floor panels 100 of a format (width×length) differing from the format of the underlying array 200 and/or elastic support structure 300. It may be preferred if one or more glass panels 100 are not aligned with the underlying array 200. One or more glass panels 100 may be offset in a first and/or second horizontal direction X, Y with respect to the underlying array 200. Conversely, an elastic support structure 300 and/or rigid substructure 400 may be dimensioned in relation to the composite glass floor panels 100 such that one respective elastic support structure 300 and/or rigid substructure 400 carries a plurality of composite glass floor panels 100. For instance, a rigid substructure 400 and corresponding elastic support structure 300 may be dimensioned appropriately to extend over an entire playing field and carry several rows and columns of horizontally adjacent composite glass panels 100. The array 200 of box structures 220 and/or display devices 210 is preferably interlocked in the first and/or second horizontal direction X, Y to evenly distribute mechanical loads.

The box structures 220 in the array 200 may be spliced together using connection members 241 configured to releasably connect the box structures 220 of adjacent display devices 210. Additionally, or alternatively, box structures 220 of neighboring assembly units 11 may be spliced together using connection members 242, 243, as shown for example in FIG. 11. Connection members 241, 242, 243 may for example include bolts adapted to be insertable into corresponding receptions of the box structures 220 in order to anchor a first box structure 220 in a directly adjacent second box structure 220. The receptions for the connection members 241, 242, 243 may be provided in the first and/or second beams 226, 227 of the box structure 220. Connection members 241, 242, 243 and receptions for rigidly connecting the box structures 220 of adjacent display devices 210 to one another may in particular be configured according to on CN 108 682 320 A or CN219 536 489U.

The connection members 242, 243 which are configured to connect adjacent arrays 200 may be pins 245, such as shown in FIG. 2. The pins 245 may be configured to have a first end 246 configured to be anchored within a first array and a second end 247 configured to be inserted into a reception of a second array. The pin 245 may have a generally cylindrical shape. The pin may extent in an axial direction from its second end 247 to its first end 246. The second end 247 of the pin may be tapered. The second end 247 of the pin may for example be conical and/or hemispherical. The first end 246 of the pin may have at least one radial feature, such as a groove, in particular an annular groove 248, or a protrusion, configured to engage a corresponding stop of the reception. The radial feature of the pin 245 and the corresponding stop of the first array may be configured to firmly attach the pin 245 to the first array. The engagement of the pin 245 to the first array may configured to be selectively releasable. The pin 245 may have a middle section 249 between the first end 246 and the second end 247 having a substantially constant cross section. The middle section 249 of the pin 245 may have a constant circular cross section. The middle section 249 of the pin 245 may be configured to fittingly engage the reception of the second array. The middle section 249 of the pin may be configured to engage the reception in a form-fitting manner in the vertical direction Z. The middle section of the pin may be optionally be configured to engage the reception in a form-fitting manner in the first or second horizontal direction X or Y perpendicular with respect to the pin axis.

The box structure 220 mechanically supports the display units 230. The weight of the composite glass floor panels 100 and any object or person thereon is borne by the box structure 220. Forces and impacts affecting the sports floor assembly 10 in the vertical direction Z are transferred from the composite glass floor panel 100 through the box structure 220 to the elastic support structure 300. The box structure 220 relieves the display unit 230 from a mechanical stress in the first and second horizontal directions X, Y. By splicing the multitude of box structures 220 of an array 200 of display devices 210 together, loads acting locally above one display device 210 are transferred to the adjacent display devices 210. Loads acting on onto one display device 210 are thus dispersed through the box structures 220 in the sports floor assembly 10. Peak loads due to impacts or the like are dispersed throughout the composite glass floor panel 100 and the box structures 220 which renders the sports floor assembly 10 particularly resilient. The sports floor assembly 10 may have an area-elastic vertical deformation value in the range of 1 mm to 4 mm, in particular in the range of 1.5 mm to 3.5 mm. The deformation may be determined in millimeters under a standard load of 1500 N, in particular according to EN 14809 (DIN EN 14809; "Surfaces for sports areas—Determination of vertical deformation—Corrigendum 1", Deutsches Institut für Normung e. V.; Deutsches Institut für Normung e. V. (DIN), April 2008).

FIG. 8 illustrates the arrangement of the plurality of display devices 210 on the elastic support structure 300. The array 200 rests directly on top of the elastic support structure 300. The elastic support structure 300 may comprise support pads 310, 320 and beam-like spring members 330, 340. The feet 228 at the corners 224 of the box structures 220 stand on the support pads 310, 320. The box structures 220 may thus be suspended by the support pads 310, 320 of the elastic support structure 300.

The first group of support pads 310 may be arranged below the outer edges of the composite glass floor panel 100. A first group of support pads 310 may be arranged along the outer circumference of an assembly unit 11. A first group of support pads 310 may be arranged directly above pillars 410 of the rigid substructure 400.

A second group of support pads 320 may be arranged within the area stand by the glass floor panel 100 and distanced from its edges. A second group of support pads 320 may be arranged in a central area of an assembly unit 11. A second group of support pads 320 may be arranged offset from the pillars 410 of the rigid substructure 400 and the first and/or second horizontal direction X, Y. Beam-like spring members 330, 340 may attach the second group of support pads 320 to the rigid substructure.

Each second support pad 320 may be arranged to carry the four corners 224 of four directly adjoining display devices 210 in a central region of the sports floor assembly 10. The first support pads 310 may be arranged along the outer circumference of the sports floor assembly 10 or an assembly unit 11. First support pads 310 arranged at the outer corners of an assembly unit 11 or sports floor assembly 10 may be configured to carry only one corner 224 of one single display unit 210. First support pads 310 arranged along the edge of an assembly unit 11 or sports floor assembly 10 may be configured to support the two corners 224 of one respective pair of directly adjacent display units 210. The first support pads 310 may be configured to be more elastic than the second support pads 320. The second support pads 320 may for example made of a substantially rigid polymer material, such as polyurethane. The first support pads 310 may be made of an elastic polymer material, such as Regupol®.

FIG. 9 allows a clear view of the elastic support structure 300 mounted on top of the rigid substructure 400. The beam-like spring members 330, 340 may be supported by pillars 410 of the rigid substructure 400. The rigid substructure 400 may be a substantially hollow framework made of a rigid material, such as cast aluminum. The rigid substructure 400 may comprise a plurality of pillars 410 with a generally vertical extension. The pillars 410 may protrude upward from the rigid substructure 400 and the vertical direction Z. F First support pads 310 may be arranged directly on top of the pillars 410. Beam-like spring members 330, 340 may be attached directly on top of the pillars 410. First beam-like spring members 330 extend into the first (lengthwise) horizontal direction X. Second beam-like spring members 340 extend into the second (crosswise) horizontal direction Y. Each beam-like spring member 330, 340 may be supported by at least one, preferably two or more pillars 410.

The elastic support structure 300 may include a mesh 350 of beam-like spring members 330, 340. The plurality of first beam-like spring members 330, which are oriented in the lengthwise direction X, and the plurality second beam-like spring members 340, which are oriented in the crosswise direction Y, form a corresponding plurality of intersections, thereby forming a mesh 350. A sports floor assembly 10 may include a plurality of first beam-like spring members 330 extending parallelly in the first horizontal direction X. Additionally, the sports floor assembly 10 may include a plurality of second beam-like spring members 340 extending parallelly in the second horizontal direction Y. The assembly unit 11 illustrated in FIG. 9, for example, includes four first beam-like spring members 330 and four beam-like second spring members 340, spread out evenly above the rigid support structure 400. At the intersection of first and second beam-like spring members 330, 340 rivets or similar connection means are provided to rigidly attached the first and second beam-like spring members 330, 340 two one another. The second support pads 320 may be suspended above the rigid substructure 400 via the mesh 350 of beam-like spring members 330, 340. All of the first beam-like spring members 330 may be arranged above the second beam-like spring members 340.

The elastic support structure 300 provides the sports floor assembly 10 with excellent mechanical properties. The sports floor assembly 10 may have a ball rebound value 93% or more. The ball rebound value may be determined by releasing a basketball from 1.8 m above the sports floor assembly, in comparison to a reference rebound value of said basketball on concrete (in particular in accordance to the method defined in EN 12235:2013). Additionally, or alternatively, the sports floor assembly may have an area-elastic force reduction value in the range of 45% to 55%. The force reduction value may be determined in accordance with EN 14808 (DIN EN 14904:2006; DIN EN 14808, "Surfaces for sports areas—Determination of shock absorption", Deutsches Institut für Normung e. V.; Deutsches Institut für Normung e. V. (DIN), March 2006; DIN EN 14904:2006, "Sportböden—Mehrzweck-Sporthallenböden", Deutsches Institut für Normung e. V. (DIN), June 2006).

FIG. 10 shows a perspective view of sports floor assembly 10 including multiple assembly units 11 and FIG. 11 shows a detailed side view of a pair of assembly units 11. The simplified illustration of FIG. 10 shows a sports floor assembly 10 consisting of two rows and two columns of assembly units 11. The skilled person understands that the number of adjacent assembly units the first horizontal direction X and/or in the second horizontal direction Y may be selected appropriately to cover a desired area to form a basketball playing field or the like. The assembly units 11 of the sports floor assembly 10 a preferably of identical design. This allows to simplify maintenance as well as assembly and disassembly of a sports floor. Each assembly unit 11 has a unit length $l_x$ and a unit width $l_y$. The assembly units 11 a provided with connection members 242, 243 fully attachment of pairs of immediately adjacent units 11 to one another. It may be preferred that the assembly units 11 are configured to be connected to one another exclusively in the layer of the array 200 of display devices 210.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

EXAMPLES

The following section contains example embodiments of the disclosure.

Example 1. A floor assembly, in particular a sports floor assembly, comprising an array of display devices facing in an upward direction (Z); and a composite glass floor panel arranged above the array of display devices, wherein the composite glass floor panel is translucent and comprises a light diffusion layer.

Example 2. The floor assembly of example 1, wherein the composite glass floor panel comprises a cover layer forming a walking surface, wherein the cover layer comprises the light diffusion layer.

Example 3. The floor assembly according to example 2, wherein light diffusion layer is formed at a surface of the cover layer.

Example 4. The floor assembly according to example 3, wherein light diffusion layer is formed by etching most or all of the surface of the cover layer.

Example 5. A floor assembly according to one of the preceding examples, comprising a plurality of composite glass floor panels, wherein the plurality of composite glass floor panels comprises pairs of adjacent composite glass floor panels, wherein a gap is defined between each pair of adjacent composite glass floor panels the gap is filled with a sealing member which is optically clear.

Example 6. The floor assembly according to one of the preceding examples, wherein the composite glass floor panel has a light transmission in the range of 30% to 90%, in particular 45% to 80%, preferably 60% to 75%, more preferably 65% to 70%.

Example 7. A floor assembly, in particular a sports floor assembly, in particular according to one of the preceding examples, comprising an array of display devices facing in an upward direction (Z); and a composite glass floor panel arranged above the array of display devices, wherein the composite glass floor panel is translucent and has a light transmission the range of 30% to 60%, in particular 45% to 55%, more particularly 50% to 52%.

Example 8. The floor assembly of example 6 or 7, wherein the composite glass floor panel comprises a cover layer made of a glass panel; a base layer made of a glass panel; and intermediate layer made of at least one polymer film, wherein the intermediate layer has a light transmission in the range of 40% to 60%, in particular in the range of 45% to 55%

Example 9. A floor assembly, in particular a sports floor assembly, in particular according to one of the preceding examples, comprising an array of display devices facing in an upward direction (Z); and a plurality of composite glass floor panels which are translucent and arranged above the array of display devices, wherein the plurality of composite glass floor panels comprises pairs of adjacent composite glass floor panels, wherein a gap is defined between each pair of adjacent composite glass floor panels the gap is filled with a sealing member which is optically clear.

Example 10. The floor assembly according to example 5 or 8, wherein the sealing member has a light transmission rate in the range of 60% to 99%, in particular in the range 75% to 97%, preferably in the range of 90% to 95%.

Example 11. The floor assembly according to example 9 or 10, wherein the gap has a gap width in the range of 0.5 mm to 5 mm, in particular in the range of 1 mm to 3 mm, preferably in the range of 1.5 mm to 2.5 mm.

Example 12. The floor assembly according to one of the preceding examples 9 to 11, wherein the sealing member comprises a sealing tube or sealing cord pinched between the pair of adjacent glass floor panels.

Example 13. The floor assembly according to one of the preceding examples 9 to 12, wherein the sealing member comprises an elastic adhesive, such as a silicone adhesive, arranged in the gap.

Example 14. The floor assembly according to one of the preceding examples, wherein the composite glass panel comprises a cover layer made of a glass panel; a base layer made of a glass panel; and intermediate layer made of at least one polymer film, wherein the cover layer, the intermediate layer and the base layer are sequentially laminated.

Example 15. The floor assembly according to one of the preceding examples, wherein the at least one polymer film of the intermediate layer comprises at least one of polyvinyl butyral (PVB), ethylene-vinyl acetate (EVA), ionoplast polymers, cast in place (CIP) liquid resin, and thermoplastic polyurethane (TPU).

Example 16. The floor assembly according to example 15, wherein the at least one polymer film further comprises a colorant.

Example 17. The floor assembly according to one of the preceding examples 14 to 16, wherein the thickness of the composite glass floor panel is in the range of 8 mm to 15 mm, in particular in the range between 10 mm and 13 mm, preferably in the range 11 mm to 12 mm.

Example 18. The floor assembly according to one of the preceding examples 14 to 17, wherein the thickness of the cover layer is in the range of 4 mm to 6 mm, in particular in the range between 4.5 mm and 5.5 mm, preferably 5 mm.

Example 19. The floor assembly according to one of the preceding examples 14 to 18, wherein the thickness of the intermediate layer is in the range of 0.5 mm to 3.0 mm, in particular in the range between 1.0 mm and 2.0 mm, preferably 1.4 mm to 1.6 mm.

Example 20. The floor assembly according to one of the preceding examples 14 to 19, wherein the thickness of the base layer is in the range of 4 mm to 6 mm, in particular in the range between 4.5 mm and 5.5 mm, preferably 5 mm.

Example 21. The floor assembly according to one of the preceding examples, wherein the cover layer is provided with a pattern of glass dots or ceramic dots distanced from each other, wherein the dots define an average dot diameter and the distance between adjacent dots is substantially larger than the average dot diameter Example 22. The floor assembly according to one of the preceding examples, wherein the composite glass floor panel has a light reflection rate in the range of 0.03 to 0.10, in particular in the range of 0.04 to 0.08, preferably in the range of 0.05 to 0.07.

Example 23. The floor assembly according to one of the preceding examples, wherein the composite glass floor panel has a mirror gloss of less than 15%, in particular less than 10%, preferably in the range of 3% to 7%, more preferably in the range 4% to 6%.

Example 24. The floor assembly according to one of the preceding examples, wherein the composite glass floor panel has a slip resistance value in the range of 85 to 105, in particular in the range of 85 to 100, preferably in the range of 88 to 98.

Example 25. The floor assembly according to one of the preceding examples, wherein the floor assembly has a ball rebound value of at least 90%, in particular at least 93%, preferably at least 95%.

Example 26. The floor assembly according to one of the preceding examples, wherein the floor assembly has an area-elastic vertical deformation value in the range of 1 mm to 4 mm, in particular in the range of 1.5 mm to 3.5 mm.

Example 27. The floor assembly according to one of the preceding examples, wherein the floor assembly has an area-elastic force reduction value in the range of 40% to 60%, in particular in the range 45% to 55%.

Example 28. The floor assembly according to one of the preceding examples, wherein glass floor panel rests directly on the array of display devices.

Example 29. The floor assembly according to one of the preceding examples wherein the array of display devices is mounted on an elastic support structure.

Example 30. The floor assembly according to one of the preceding examples wherein the display devices are spliced together using connecting members configured to releasably connect adjacent arrays of display devices.

Example 31. The floor assembly according to one of the preceding examples 29 or 30, wherein elastic support structure rests on a rigid substructure, wherein one glass floor panel is associated with one respective rigid substructure.

LIST OF REFERENCE NUMERALS 10 sports floor assembly
11 assembly unit
100 composite glass floor panel
101 top surface
110 cover layer
111 diffusion layer
120 intermediate layer
130 base layer
150 dots
160 gap
170 sealing member
171 sealing cord
172 elastic adhesive
200 array of display devices
210 display device
220 box structure
224 box structure corner
226 first beam
227 second beam
228 foot
230 display unit
231 LED
232 flat panel surface
233 protrusion
235 retraction
241 connecting member
242 connecting member
243 connecting member
245 pin
246 first end
247 second end
248 feature
249 middle section
300 support structure
310 support pad
320 support pad
330 spring member
340 spring member
350 mesh
400 substructure
410 pillar
420 leg
430 recess
X first (lengthwise) horizontal direction
Y second (crosswise) horizontal direction
Z vertical direction a thickness (cover layer)
b thickness (intermediate layer)
c thickness (base layer)
d thickness (light diffusing layer)
$l_X$ unit length
$l_Y$ unit width
m average diameter
p dot pitch
s scattered light
t thickness (panel)
v light cone

The invention claimed is:

1. A floor assembly, comprising:
an array of display devices facing in an upward direction and mounted on an elastic support structure, wherein the elastic support structure rests on a rigid substructure; and
a composite glass floor panel arranged above the array of display devices and respectively associated with the rigid substructure,
wherein the composite glass floor panel is translucent and comprises a light diffusion layer.

2. The floor assembly of claim 1, wherein the composite glass floor panel comprises a cover layer forming a walking surface, wherein the cover layer comprises the light diffusion layer.

3. The floor assembly according to claim 2, wherein the light diffusion layer is formed at a surface of the cover layer.

4. The floor assembly according to claim 1, comprising a plurality of composite glass floor panels,
wherein the plurality of composite glass floor panels comprises pairs of adjacent composite glass floor panels,
wherein a gap is defined between each pair of adjacent composite glass floor panels, the gap being filled with a sealing member which is optically clear.

5. The floor assembly according to claim 1, wherein the composite glass floor panel has a light transmission in a range of 30% to 90%.

6. The floor assembly according to claim 1, wherein the composite glass floor panel comprises:
a cover layer made of a glass panel;
a base layer made of a glass panel; and
an intermediate layer made of at least one polymer film, wherein the cover layer, the intermediate layer, and the base layer are sequentially laminated.

7. The floor assembly according to claim 6, wherein the at least one polymer film of the intermediate layer comprises: polyvinyl butyral (PVB), ethylene-vinyl acetate (EVA), ionoplast polymers, cast in place (CIP) liquid resin, and/or thermoplastic polyurethane (TPU).

8. The floor assembly according to claim 6, wherein a thickness of the composite glass floor panel is in a range of 11 mm to 12 mm.

9. The floor assembly according to claim 6, wherein a thickness of the cover layer is in a range of 4.5 mm to 5.5 mm, wherein the thickness of the intermediate layer is in a range of 1.0 mm to 2.0 mm, and wherein the thickness of the base layer is in a range of 4.5 mm to 5.5 mm.

10. The floor assembly according to claim 6, wherein the cover layer is provided with a pattern of glass dots or ceramic dots distanced from each other, wherein the dots define an average dot diameter.

11. The floor assembly according to claim 1, wherein the composite glass floor panel has a light reflection rate in a range of 0.05 to 0.07.

12. The floor assembly according to claim 1, wherein the composite glass floor panel has a mirror gloss in a range of 4% to 6%.

13. The floor assembly according to claim 1, wherein the composite glass floor panel has a slip resistance value in a range of 88 to 98.

14. The floor assembly according to claim 1, wherein glass floor panel rests directly on the array of display devices.

15. A floor assembly, comprising:

an array of display devices facing in an upward direction and mounted on an elastic support structure, wherein the elastic support structure rests on a rigid substructure; and a composite glass floor panel arranged above the array of display devices and respectively associated with the rigid substructure, wherein the composite glass floor panel is translucent and has a light transmission a range of 45% to 55%.

16. The floor assembly of claim 15, wherein the composite glass floor panel comprises:

a cover layer made of a glass panel;

a base layer made of a glass panel; and an intermediate layer made of at least one polymer film, wherein the intermediate layer has a light transmission in a range of 40% to 60%.

17. A floor assembly, comprising:

an array of display devices facing in an upward direction and mounted on an elastic support structure, wherein the elastic support structure rests on a rigid substructure; and a plurality of composite glass floor panels which are translucent and arranged above the array of display devices, one of the plurality of composite glass floor panels being associated with a respective one of the rigid substructure, wherein the plurality of composite glass floor panels comprises pairs of adjacent composite glass floor panels, and wherein a gap is defined between each pair of adjacent composite glass floor panels, the gap being filled with a sealing member which is optically clear.

18. The floor assembly according to claim 17, wherein the sealing member has a light transmission rate in a range of 85% to 95%.

19. The floor assembly according to claim 17, wherein the gap has a gap width in a range of 1.5 mm to 2.5 mm.

20. The floor assembly according to claim 17, wherein the sealing member comprises a sealing tube or sealing cord pinched between the pair of adjacent glass floor panels.

21. The floor assembly according to claim 17, wherein the sealing member comprises an elastic adhesive arranged in the gap.

\* \* \* \* \*